Nov. 8, 1966　　M. E. WOOD　　3,284,019
SPINNING REEL
Original Filed Oct. 5, 1960　　9 Sheets-Sheet 1
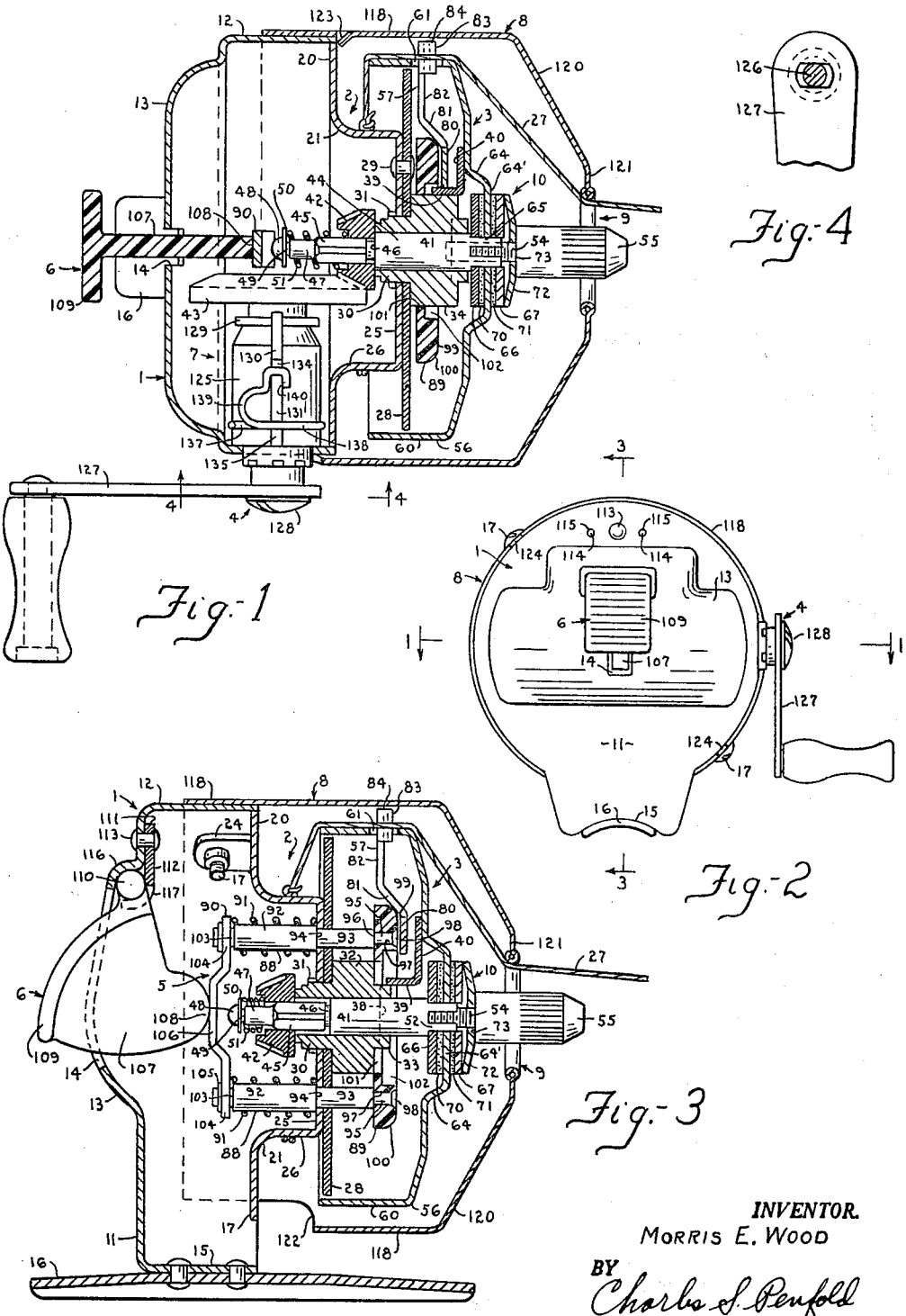
INVENTOR.
MORRIS E. WOOD
BY Charles S. Penfold
ATTORNEY

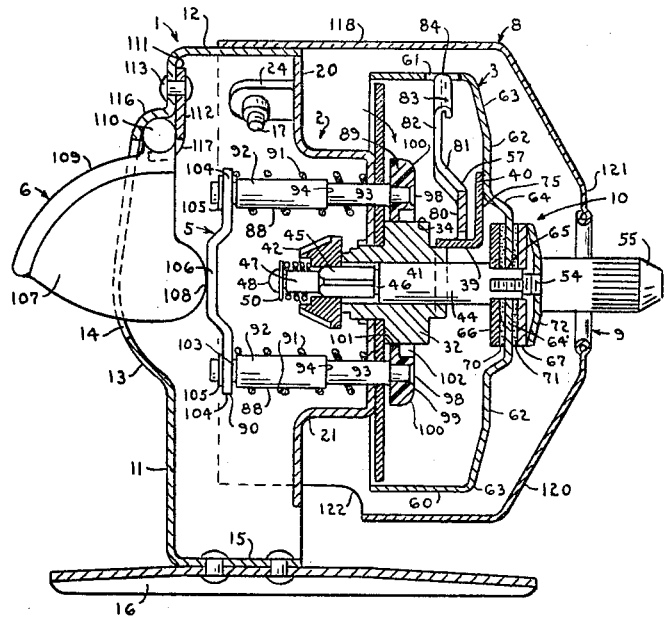
Fig.-5
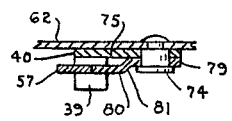
Fig.-8
Fig.-9
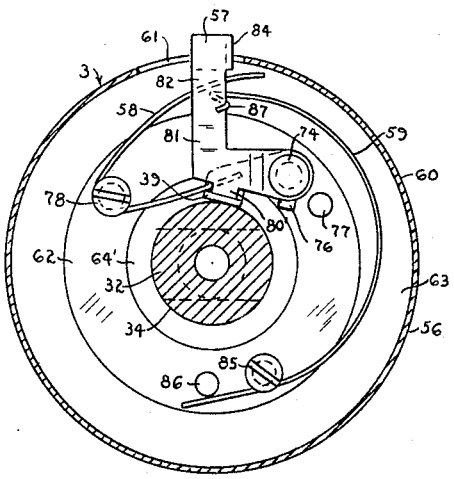
Fig.-6
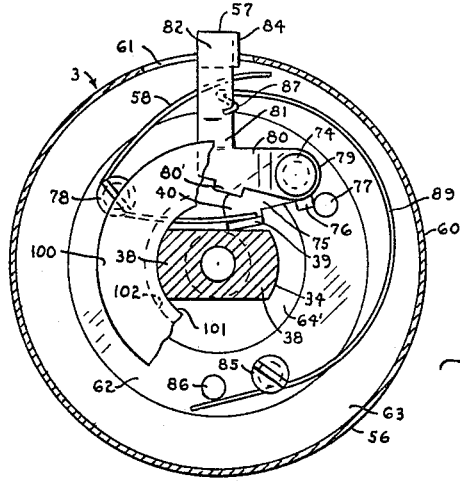
Fig.-7
INVENTOR.
MORRIS E. WOOD
BY Charles S. Penfold
ATTORNEY Nov. 8, 1966     M. E. WOOD     3,284,019
SPINNING REEL
Original Filed Oct. 5, 1960     9 Sheets-Sheet 3
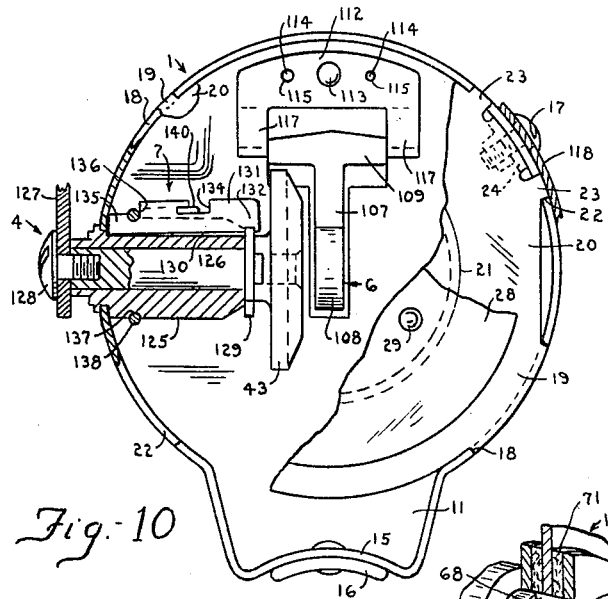
Fig.-10
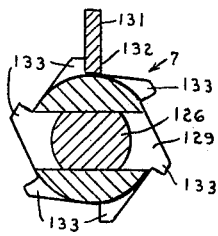
Fig.-12
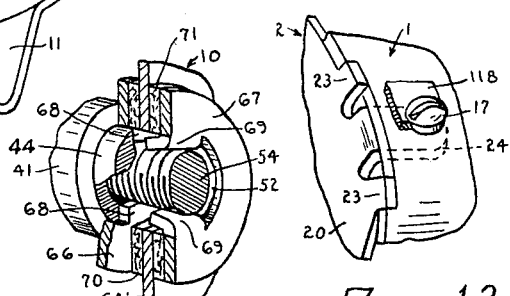
Fig.-13
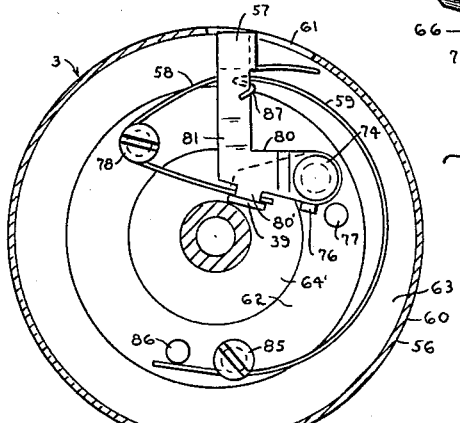
Fig.-11
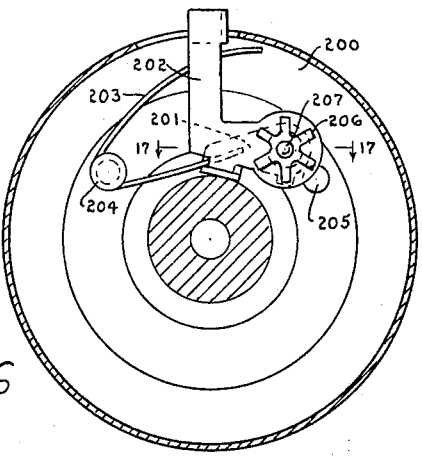
Fig.-16
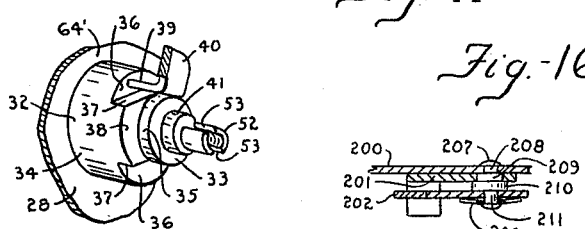
Fig.-14    Fig.-15    Fig.-17
INVENTOR.
MORRIS E. WOOD
BY
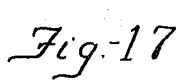
ATTORNEY Nov. 8, 1966    M. E. WOOD    3,284,019
SPINNING REEL
Original Filed Oct. 5, 1960    9 Sheets-Sheet 4

INVENTOR.
MORRIS E. WOOD
BY Charles S. Penfold
ATTORNEY

Nov. 8, 1966   M. E. WOOD   3,284,019
SPINNING REEL
Original Filed Oct. 5, 1960   9 Sheets-Sheet 5

INVENTOR.
MORRIS E. WOOD
BY Charles S. Penfold
ATTORNEY

Nov. 8, 1966    M. E. WOOD    3,284,019
SPINNING REEL
Original Filed Oct. 5, 1960    9 Sheets-Sheet 7

INVENTOR.
MORRIS E. WOOD
BY
Charles S. Penfold
ATTORNEY

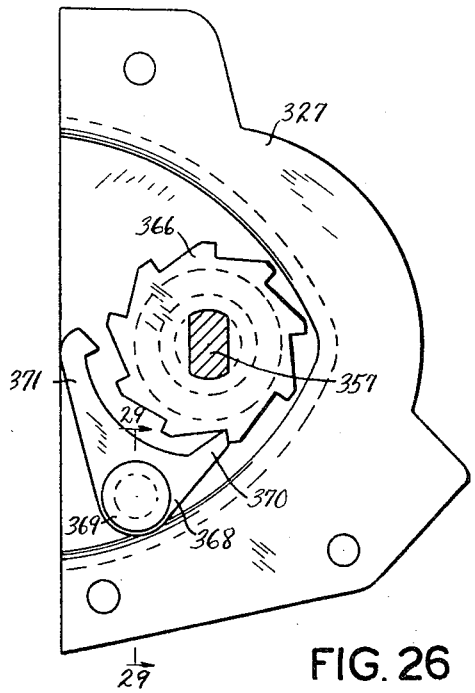
FIG. 26
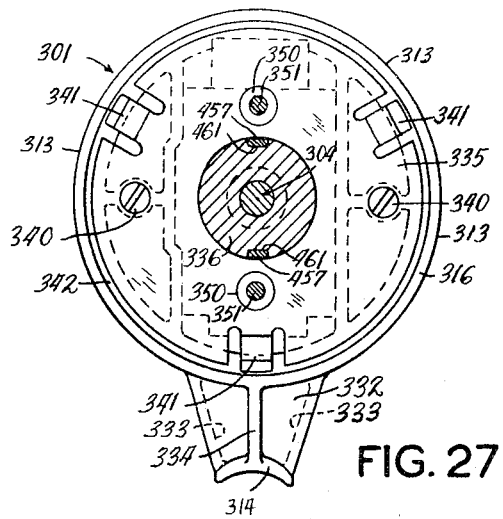
FIG. 27
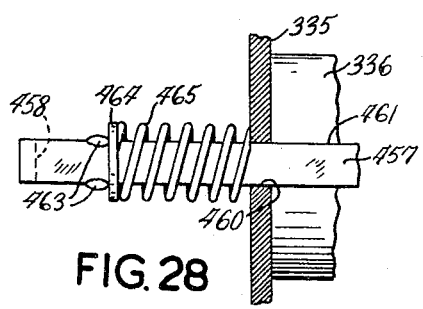
FIG. 28
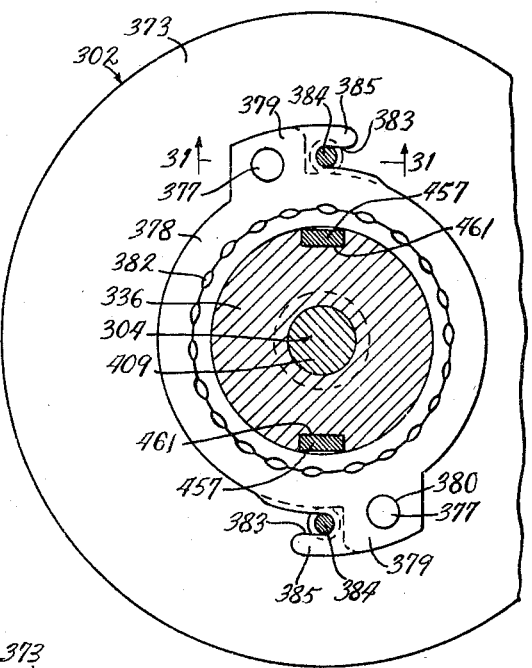
FIG. 30
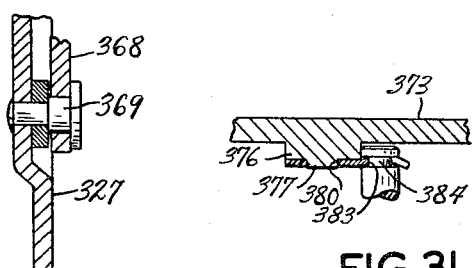
FIG. 29   FIG. 31
INVENTOR.
MORRIS E. WOOD
BY
ATTORNEY Nov. 8, 1966   M. E. WOOD   3,284,019
SPINNING REEL
Original Filed Oct. 5, 1960   9 Sheets-Sheet 9
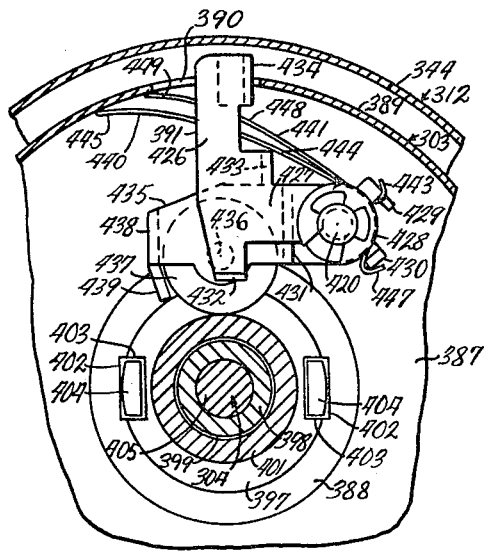
FIG. 32
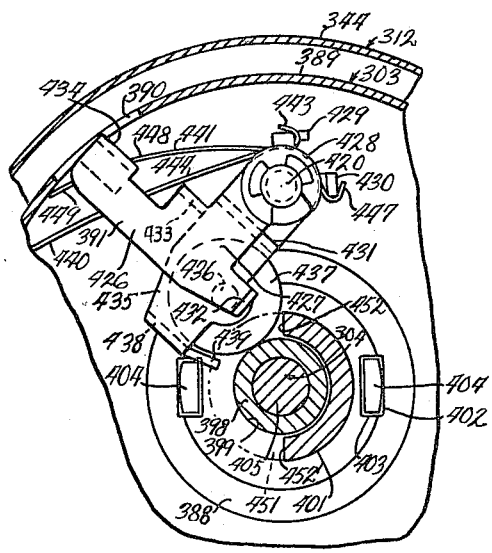
FIG. 33
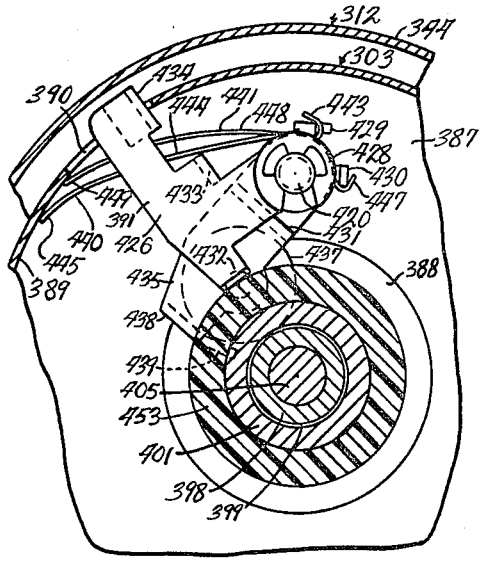
FIG. 34
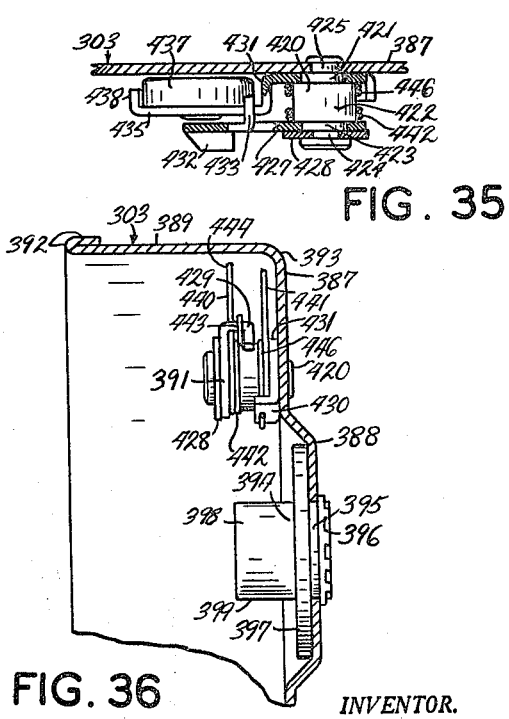
FIG. 35
FIG. 36
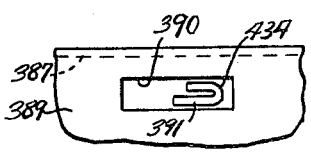
FIG. 37
INVENTOR.
MORRIS E. WOOD
BY Charles A. Penfold
ATTORNEY

United States Patent Office 3,284,019
Patented Nov. 8, 1966

3,284,019
SPINNING REEL
Morris E. Wood, Bronson, Mich., assignor, by mesne assignments, to Bronson Specialties, Incorporated, Bronson, Mich., a corporation of Michigan
Continuation of applications Ser. No. 60,647, Oct. 5, 1960, Ser. No. 105,631, Apr. 26, 1961, and Ser. No. 227,627, Sept. 24, 1962. This application Apr. 26, 1965, Ser. No. 453,552
33 Claims. (Cl. 242—84.21)

The subject application is a continuation of my applications Serial Nos. 60,647; 227,627; and 105,631, and now abandoned.

The subject invention relates generally to fishing reels and more particularly is directed to improvements in a reel of the spinning type.

More particularly, an important object of the invention is to provide a reel which includes a stationary means or tubular bearing, a shaft mounted in the bearing for axial and rotational movement, a line pickup assembly comprising a drum or carrier mounted on the shaft in front of a spool and a pair of spring biased levers carried by the drum and operatively connected for radial movement for influencing or controlling the line, an actuating means or cam assembly for axially shifting the pickup assembly forwardly relative to the spool, and a manual control or actuator for operating the actuating means.

A significant object of the invention is to provide a reel including the aforesaid components or instrumentalities in which one of the levers serves as a line pickup lever and the other serves as a control lever or means to engage or coact with a portion of the stationary means and the pickup lever or means for maintaining the latter in a line winding position when the pickup assembly is in a fully retracted position or condition.

Another important object of the invention is to provide an organization whereby the control lever also serves to engage another portion of the stationary means or bearing when the pickup assembly is shifted to a predetermined forward position to temporarily hold or lock the pickup assembly in such position and at the same time render the pickup lever free for rotation by the line to permit the line to run off the spool over the drum and out through an eye or line guide opening provided in the fore end of a cover of the reel.

Also, an object of the invention is to provide an organization in which the actuating means or cam assembly, above referred to, may be operated to engage and move the pickup lever to an extended position so that the lever will serve to retard or stop the flow of line from the spool, as desired, when the pickup assembly is in the forward locked position. Otherwise expressed, the actuating means may be utilized to control the pickup lever so that the latter will allow the line to run free from the spool or retard or stop its flow therefrom.

A further object of the invention is to provide a reel with a drag control for imparting and regulating a drag action on the pickup assembly so that it may rotate relative to the shaft to retard outflow of the line when the pickup lever is extended or projected laterally of the drum by the actuating means to engage the line to control such flow. In other words, the pickup assembly may rotate with the shaft or relative thereto, depending on the relative positions of the drag control and pickup means or lever.

An additional object of the invention is to provide a unique modified structure in which the pickup lever is biased by an axial force so that the lever will be automatically held in any one of an infinite number of rotative positions as distinguished from a radial force for normally urging the lever inwardly.

A specific object of the invention is to provide means, such as a roller, on the control member to facilitate its engagement with bearing surfaces or the stationary means above referred to, including resilient means for counterbalancing the control element to assist in predetermining one of its positions and resilient means for biasing or urging the control member in a predetermined direction.

Another object of the invention is to provide a reel comprised of various self-contained subassemblies or units embodying improved principles of design and construction and in which certain ones are operatively assembled and disassembled in unique ways.

A significant object is to provide a novel organization comprising a reciprocably mounted spool and a rotatable line control assembly in which the control element thereof will direct the line onto the spool when the assembly and spool are operated by a driving means, means whereby the assembly can be shifted forwardly to a predetermined position relative to the spool, and means including an actuator whereby the element can be manipulated to control the flow of line from the spool when the assembly is shifted to such position.

Also, an object of the invention is to provide a mounting unit for the spool and line control assembly which is detachably connected to the reel frame and a cover which is detachably connected to the unit in a novel way.

A particularly significant object of the invention is to provide an organization whereby the line friction is substantially reduced, thereby providing a more powerful retriever in relationship to any given drag setting.

Other objects of the invention reside in providing reels which offer distinct advantages with respect to design and construction, cost of manufacture and assembly on a production basis, efficiency in operation and durability.

Additional objects and advantages of the invention will readily become apparent after the description hereinafter set forth is considered in conjunction with the drawings annexed hereto which disclose the subject matter embodied in the applications above referred to.

In the drawings:

FIGURE 1 is a horizontal section of the reel shown in application Serial No. 227,627 taken substantially on line 1—1 of FIGURE 2, with the pickup assembly shown in a normal line winding position;

FIGURE 2 is a rear elevational view of the reel;

FIGURE 3 is a vertical section taken substantially on line 3—3 of FIGURE 2, showing the pickup assembly and actuating means therefor in their respective foremost axial line casting positions;

FIGURE 4 is a transverse section taken substantially on line 4—4 of FIGURE 1;

FIGURE 5 is a vertical section, similar to FIGURE 3, showing the pickup assembly locked in a forward position by the control lever and the actuating means in a retracted position;

FIGURE 6 is a transverse section showing the pickup lever held in an extended operative position by the control lever for winding the line onto the spool in accord with FIGURE 1;

FIGURE 7 is a transverse section, similar to FIGURE 6, depicting the control lever engaging the stationary means preparatory to locking the pickup assembly in a forward position and the pickup lever in an extended position by the actuating means substantially in accord with FIGURE 3;

FIGURE 8 is a parital view illustrating the mode of detachably securing the cover and housing of the reel;

FIGURE 9 is a parital sectional view showing structural characteristics of the levers;

FIGURE 10 is a vertical view of the reel, with portions in section, to illustrate details of the structure;

FIGURE 11 is a transverse section, similar to FIGURES 6 and 7, showing the pickup lever in a retracted position;

FIGURE 12 is an enlarged partial sectional view of a ratchet mechanism constituting a component of the reel;

FIGURE 13 is an enlarged partial perspective view showing the mode of attaching the cover, frame and spool or line support of the reel together;

FIGURE 14 is an enlarged perspective view of sections of the drag structure;

FIGURE 15 is an enlarged partial perspective view showing the relationship of the control lever to various surfaces of the stationary means or bearing supporting the shaft which carries the pickup assembly;

FIGURE 16 is a transverse section exemplifying a modified pickup assembly in which the pickup lever is biased axially as distinguished from radially;

FIGURE 17 is a transverse section taken substantially on line 17—17 of FIGURE 16;

FIGURE 26 is an enlarged inside view of a detachable side member of the reel which carries the driving means and a ratchet mechanism therefor;

FIGURE 27 is a front elevational view of the reel frame, with portions of the reel in section;

FIGURE 28 is an enlarged partial vertical section of a part of a means for shifting the line control assembly;

FIGURE 29 is an enlarged transverse section taken substantially on line 29—29 of FIGURE 26;

FIGURE 30 is an enlarged vertical section showing the mode of detachably connecting the spool to the mounting unit and shifting means;

FIGURE 31 is an enlarged transverse section taken substantially on line 31—31 of FIGURE 30;

FIGURE 32 is an enlarged partial vertical section showing the control element of the control assembly in a line winding position;

FIGURE 33 is an enlarged partial vertical section showing the line control element in a retracted position whereby the line is free to unwind from the spool;

FIGURE 34 is an enlarged partial vertical section showing the line control element held in a position substantially corresponding to that in FIGURE 32 by the actuator to prevent or control release of the line from the spool;

FIGURE 35 is an enlarged partial transverse section taken through the line control assembly showing details of the control element, a control member therefor, and a roller carried by the latter;

FIGURE 36 is an enlarged partial transverse section showing details of the drum of the line control assembly; and FIGURE 37 is an enlarged partial side view of the drum and the control element with the latter disposed in relation to an opening provided therefor in the drum.

Figure 18:
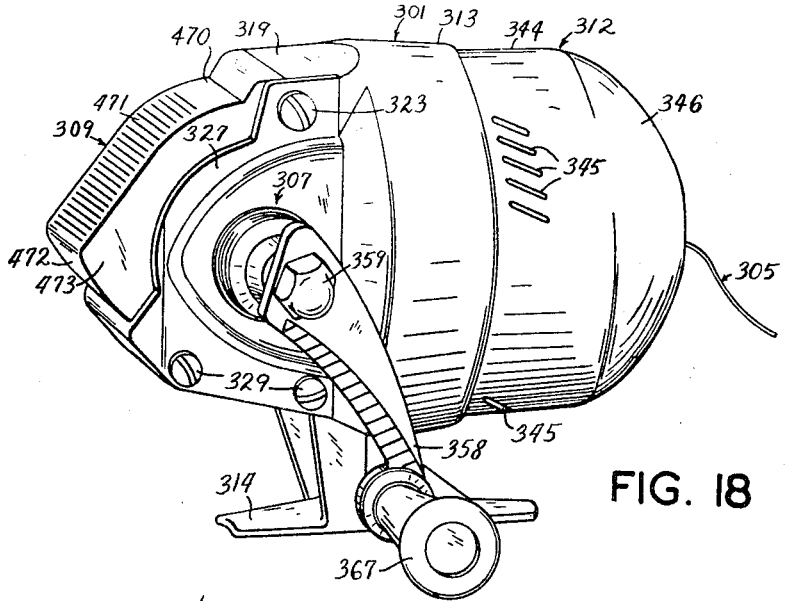
FIGURE 18 is a perspective view of a modified reel structure embodying the subject matter of application Serial No. 105,631.
Figure 21:
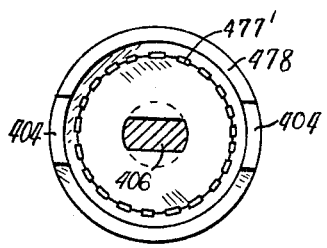
FIGURE 21 is a transverse section taken substantially on line 21—21 of FIGURE 20.

Referring more particularly to the drawings, numeral 1 generally designates a frame or housing; 2 a line support or spool; 3 a line pickup assembly for directing a line onto the spool; 4 a driving means for rotating the pickup assembly; 5 an actuating means or cam assembly for shifting the pickup assembly forwardly of the spool; 6 an actuator or control for operating the actuating means; 7 a ratchet mechanism; 8 a cover provided with a line guide or opening 9; and 10 a drag or brake assembly operatively associated with the pickup assembly and provided with a handle extending through the opening to facilitate and control adjustment of the brake assembly as desired.

The frame 1, above referred to, is preferably made in the form of a cup having a base wall 11 and a side wall 12. The base wall is preferably pressed outwardly to form a relatively large horizontal bulge or concavo-convex depression 13 provided with a vertical T-shaped opening 14 through which the actuator 6 extends.

The base wall and the side wall are preferably constructed to include a depending hollow radial formation having a lower concave seat 15 in which is secured an elongate plate 16 for attaching the reel to a pole or rod in a conventional manner so that the reel may be supported in a vertical position with its open side preferably facing the end of the pole or rod.

The spool 2, as shown in FIGURES 1, 5, 10 and 13, is preferably detachably connected to the frame by screws 17. More specifically in this regard, the free marginal edge of the side wall 12 of the frame is provided with a pair of diametrically disposed seats or notches 18 which receive a pair of offsets 19 extending radially from an annular radial flange 20 of a rear part 21 of the spool. The side wall of the frame is also provided with a pair of notches 22, corresponding to the notches 18, which respectively receive diametrically disposed pairs of offsets 23. The flange 20 is also provided with a pair of lugs 24 which are respectively disposed between the pairs of offsets 23 and extend rearwardly against the inner surface of the side wall 12. The screws 17 extend through holes provided therefor in the side wall of the frame and engage threaded apertures provided in the lugs 24 for securing the spool in a fixed balanced condition on the frame, with the rear part 21 of the spool substantially closing off the front open side of the frame. The notches and offsets are preferably arranged so that the spool can be affixed to the frame in either of two positions in order to facilitate their assembly.

The rear part 21 of the spool includes the radial flange 20, above alluded to, and a forwardly extending central formation having a base wall 25 and a cylindrical wall 26 for supporting a line 27. The spool also comprises a front part 28 in the form of a planar plate which is preferably secured in a firm abutting relationship with the base wall 25 of the rear spool part by three rivets 29. It will be noted that the front part of the spool has a diameter which is somewhat less than the diameter of the rear part.

The line pickup assembly 3 and mode of mounting the same for movement with respect to the spool will now be described. A stationary means or cylindrical tubular bearing has a reduced cylindrical portion 30 which extends rearwardly through aligned holes in the spool parts and is upset against the rear face of the base wall 25 of the rear spool part 21 as indicated at 31. The bearing also includes an enlarged cylindrical portion 32 abutting the front spool part 28 and a reduced forwardly extending cylindrical portion 33. The enlarged cylindrical portion defines a peripheral bearing surface 34 and the reduced portion defines a peripheral surface 35. The enlarged portion is also provided with diametrically disposed interruptions or notches, each of which is defined by a chordal shaped abutment or radial surface 36 and an axial surface 37. The axial surfaces 37 are tangent to the peripheral bearing surface 35 of the reduced portion 33 and due to the notches the enlarged cylindrical portion 32 is divided into a pair of portions having diametrically disposed arcuate planar abutments or radial surfaces 38 which are arranged in advance of and in parallel relation to the chordal shaped radial surfaces 36. Certain of the aforesaid surfaces are adapted for selective or joint cooperation with a rearwardly extending finger or flange 39 formed on a control lever 40 in a manner which will be described more in detail subsequently.

A driven shaft 41 is rotatably and slidably mounted in the tubular bearing. This shaft carries the pickup assembly 3 and a pinion gear 42 which meshes with a drive gear 43 of the driving means 4 for rotating the driven shaft and pinion gear. The shaft preferably includes cylindrical portion 44 which is journalled in the bearing, a squared portion 45 having a cross dimension less than the portion 44, a shoulder 46 disposed between the portions 44 and 45, and an inner reduced cylindrical portion 47 provided with an end 48 and an adjacent transverse annular groove 49. A spring clip or abutment 50 is detachably seated in this groove for holding a helical spring 51 between the clip and pinion gear to cause this gear to normally bear against the shoulder 46. The pinion is provided with a squared aperture for receiving the squared portion 45 of the shaft to slidably key the gear thereon. The helical spring normally surrounds the inner reduced portion 47 and a portion of the squared portion 45 of the shaft, with its fore end seated in a small circular recess provided in the rear face of the pinion as shown in FIGURES 1, 3 and 5. With this organization the shaft and pickup assembly thereon can be rotated through the agency of the gears and, when desired, can be shifted forwardly away from the spool by the actuator 6 through the agency of the actuating means 5.

The driven shaft is also formed with an outer reduced cylindrical tubular portion 52 provided with a pair of parallel longitudinally extending slots 53. The adjacent cylindrical portion 44 of the shaft is provided with an axially extending threaded aperture which receives a threaded portion 54 of a manual drag control 55. This control is preferably constructed in the form of a knurled handle or knob which extends through the line guide opening 9 to facilitate adjustment of the drag means 10 to regulate the amount of force applied to the line pickup assembly for retarding its rotational movement with respect to the shaft and/or spool to control release of the line from the spool.

The pickup assembly comprises a drum or cup member 56, the control lever 40, above referred to, a pickup lever or member 57, and a pair of springs 58 and 59 respectively operatively connected to the levers 40 and 57. The structural characteristics of these levers and their operation will be described more in detail subsequently. The drum includes a cylindrical axial side wall 60 provided with a circumferentially extending rectangular opening 61, a radial base wall 62, and an inclined portion 63 joining the side and base walls. The base wall is formed to provide a central circular depression 64 having an end wall 64' with a round opening 65 therein through which the outer reduced portion 52 of the driven shaft extends to permit relative rotation therebetween. A pair of rigid planar friction members 66 and 67, preferably of metal, are mounted on and keyed to the driven shaft as shown in FIGURE 14. More particularly, the friction member 66 has radial projections 68 which extend into the slots 53 for keying this member to the shaft and the friction member 67 has axially extending projections 69 which extend into the slots for keying this member to the shaft. The member 66 bears against a shoulder formed on the shaft and is preferably made somewhat thicker than the member 67 so that it will withstand axial thrust and impart stability to the pickup assembly. The axial projections 69 on the member 67 insure retention of this member on the shaft so that it will not shift axially in the event the control 55 is unscrewed to an extent that would otherwise normally release these projections from the slots.

A pair of corresponding resilient planar friction elements 70 and 71 are provided with round holes through which the outer rdeuced portion 52 of the shaft extends. The friction element 70 is interposed between the fixed member 66 and the end wall 64' of the depression 64 of the pickup drum. The friction member 67 abuts a dished spring washer 72 backed against a shoulder 73 on the drag control 55 and the friction element 71 is interposed between the end wall of the depression and the friction member 67. The depression serves to provide a relatively large area or space between the front part of the spool and the base wall of the drum to better accommodate the fore part of the bearing, the friction member 66 and element 70, as well as stabilize the drum on the shaft. With this unique organization, the drag control 55 which holds the friction members, friction elements, spring washer and the drum in a predetermined assembled relation on the driven shaft can be readily manipulated to cause the friction elements to engage and clamp the end walls of the depression of the drum therebetween to lock the drum for rotation with the shaft or allow the drum to rotate relative to the shaft. In other words, the control can be screwed tightly onto the driven shaft to substantially prevent relative rotational movement between the pickup and driven shaft or loosened to obtain a variable drag action therebetween in order to offer resistance to the outward flow of line through the guide opening 9 from the spool. Attention is directed to the fact that the guide opening is relatively large and formed by spinning a flange over against the inner surface of the cover 8 to provide a convex surface and that the drage control is of predetermined diameter and length for axial disposition in the opening to facilitate manipulation of the control and provide an annular space thereabout to assist in controlling the flow of line to and from the spool.

The control lever 40 and pickup lever 57 of the pickup assembly will now be described. These levers are pivotally mounted on a cylindrical portion of a headed stud 74 between the base wall 62 of the drum and head of the stud with the control lever disposed in advance of the pickup lever. The stud is fixed to the base wall 62. The control lever includes a flat radial portion 75 and the finger 39 thereon is offset laterally from one side of this portion adjacent its free end. The portion 75 adjacent its end pivoted to the stud is provided with a lug 76 extending laterally therefrom for engaging a stop 77 anchored to the base wall 62 for limiting counter-clockwise movement of both levers, as viewed in FIGURE 11, when the pickup assembly is removed from the shaft. The spring 58, above referred to, is elongate and has a loop surrounding a screw 78 attached to the base wall 62, an extremity engaging the side wall 60 of the drum, and an extremity engaging the finger 39 for urging the control lever in said counter-clockwise direction toward the various surfaces 34 through 37 on the tubular bearing.

The pickup lever 57 may be designed and constructed in various ways but as illustrated, includes an elongate radial part having a flat portion 79 at one end through which the stud 74 extends and a planar portion 80 offset from the portion 79 in spaced parallel relation to the flat portion 75 of the control lever 40 to provide clearance or a space for that extremity of the spring 58 which abuts the lug 39 on the control lever. The planar portion 80 is provided with a lug 80' extending laterally from one side thereof for engaging the outer surface of the finger 39 of the control lever and the opposite side of the portion 80 is provided with a laterally extending arm having an inclined or cam portion 81 for engaging a part of the actuating means and a radial portion 82. The free end of the radial portion is provided with a portion 83 bent or folded over in spaced relation to such end to form an elongate convex or curved line engaging portion or surface 84. The free end of the arm including the surface 84 are adapted for movement outwardly through the opening 61 in the side wall 60 of the drum for controlling the line, as evidenced in FIGURES 1 and 6, or for retraction to a position within the peripheral confines of the side wall as depicted in FIGURES 5 and 11 to permit the line 27 to run free from the spool 2.

The spring 59, above referred to, includes a loop secured about a screw 85 secured to the base wall 62 of the drum, a relatively short extremity engaging a stop 86 secured to the wall 62, and an elongate extremity, disposed about the control lever, having a hooked end 87 which receives an edge of the radial portion 82 of the pickup lever, for normally urging this lever in a counterclockwise direction or retracted position, as shown in FIGURE 11. With this arrangement, the spring 58 urges the finger 39 on the control lever toward the bearing and the spring 59 urges the lug 80' on the pickup lever against the finger 39 on the control lever to assist in urging both levers toward the bearing. It will be noted that the finger 39 also serves as a stop for the pickup lever, an abutment for the spring 58 and as a follower for engaging the surfaces 34, 35, 36 and 37 on the bearing or stationary means alluded to above, all of which will be described more in detail subsequently.

It will also be noted that whenever the control lever is moved in a clockwise direction from the position shown in FIGURE 11, the pickup lever will be simultaneously moved thereby, which increases the tension on both of the springs 58 and 59.

In view of the foregoing, it will be apparent that the spool, pickup assembly, drag means, and driven shaft are all operatively connected together to constitute a subassembly which can be readily and quickly attached to the frame and that the pickup assembly and drag means also comprise subassemblies.

The actuating means or cam assembly 5 for shifting the pickup assembly through agency of the actuator 6 will now be described. This actuating means comprises a pair of diametrically disposed corresponding rods or members 88, a cam or operating element 89 connected to the fore ends of the rods, a bridge 90 connected to the rear ends of the rods, and a pair of helical springs 91 respectively carried by the rods for normally urging the actuating means rearwardly to the position exemplified in FIGURES 1 and 5. The rods include cylindrical extremities 92 and reduced cylindrical extremities 93, the latter of which extend for reciprocation through aligned apertures provided therefor in the spool parts 21 and 28. Forward movement of the actuating means and pickup assembly are limited by shoulders 94 formed on the rods between their extremities. The free ends of the reduced extremities 93 are further reduced at 95 to provide shoulders 96. The reduced ends 95 extend through holes 97 in the cam element 89 and are upset at 98 to firmly secure the element against the shoulders 96. The upsets 98 are inset or flush with an annular front face 99 of the cam element 89.

The cam element is preferably made in the form of a ring of plastic material and includes a bevel or inclined portion 100 serving as a cam for engaging the cam portion 81 of the pickup lever. The ring is also provided with a round opening 101 through which the enlarged cylindrical portion 32 of the bearing extends to assist in guiding the ring. The opening is countersunk to provide an annular clearance recess 102 which receives the finger 39 of the control lever 40 when the parts are in the position of FIGURE 1.

The rear longer extremities of the rods are provided with reduced ends 103 which extend through holes provided therefor in offset ends 104 of the bridge 90. The bridge is detachably held on the rods by spring clips 105 which engage annular grooves in the reduced ends 103.

The bridge is provided with an intermediate portion 106 which clears the rear or aft end 48 of the shaft 41 and serves as an abutment for engagement by the actuator 6. Attention is directed to the fact that this shaft is not engaged by any manually engageable control as disclosed in my copending application.

The actuator generally designated 6 for shifting the actuating means and pickup assembly axially forward is preferably made in the form of a lever, T-shaped in cross-section, as viewed in FIGURES 1, 2, and 10, and includes a planar portion 107 which extends through the T-shaped opening 14 in the enlargement 13 of the frame. This planar portion is provided with a rounded nose or cam portion 108 for engaging the abutment 106 of the bridge 90. The actuator also includes an arcuate ribbed head portion 109, the major portion of which is exposed for manual engagement by the thumb of the operator.

The upper part of the actuator is provided with a pair of trunnions 110 extending laterally therefrom. A bracket 111 has a planar portion 112 secured against the inner surface of the base wall 11 of the frame above the depression 13 by a rivet 113. In order to stabilize the position of the bracket the wall 11 is preferably distorted forwardly at 114 into small apertures 115 provided therefor in the planar portion 112 on either side of the rivet. The depression or bulge 13 is formed with an upper offset portion 116 which merges with the bulge and the planar portion of the bracket is provided with a pair of longitudinally spaced curved tongues 117 which extend rearwardly toward the offset portion 116 and form in combination therewith a pair of curved means which journal or pivotally receive the trunnions 110. A portion of the actuator is disposed between the tongues to center the actuator in the T-shaped opening 14 so that the actuator may freely swing or gravitate against the bridge 90 without engaging the marginal edges of the material defining the opening 14. Otherwise expressed, the actuator is suspended for free pivotal movement and due to its shape and weight distribution its curved nose or cam portion 108 will normally rest or bear against the bridge.

The cover generally designated 8 may be designed and constructed in various ways but as illustrated preferably comprises an axially extending cylindrical wall 118 substantially surrounding the side wall 12 of the frame, a conical portion 120, and an end wall 121 in which the line guide opening 9 is provided. The cylindrical wall 118 telescopically embraces the cylindrical side wall 12 of the frame and is notched at 122 to receive the lower offset portion of the frame. The wall 118 is also provided with a pair of inturned portions 123 (only one is shown in FIGURE 1). The inturned portions constitute stops that limit the extent of the relative sliding of the frame and cover toward one another and at the same time locate a pair of notches 124 in the wall 118 in registry with holes provided therefor in the side wall 12 of the frame so that the screws 17 can be extended through the notches, holes and connect with the threaded apertures provided in the lugs 24 of the rear spool part 21 for holding the cover and spool in assembled relationship. After these components have once been assembled the screws may be loosened without removal to permit the cover to be slid off the frame to obtain access to the pickup assembly and drag means to facilitate their repair, removal or replacement from the driven shaft if required.

The driving means generally designated 4, as clearly shown in FIGURES 1 and 10, will now be described. A cylindrical tubular bearing 125 has a reduced outer end which extends through an aperture in the side wall of the frame and is upset and otherwise secured against rotation against the outer surface of this wall to permanently anchor the bearing in place, with the major portion of its length extending radially toward the longitudinal axis of the frame.

A drive shaft 126 is journalled in the bearing and its outer end portion is squared and provided with an axial threaded aperture as shown in FIGURE 4. A crank 127 is provided with a squared opening which receives the squared portion of the shaft and a screw 128 engages the threads of the aperture for detachably securing the crank for rotation with the shaft.

The drive gear 43 is fixed on the drive shaft for movement therewith and meshes with the pinion gear 42 for rotating the pickup assembly. A ratchet wheel 129 is preferably fixed on the shaft and engages the inner end of the bearing for limiting outward movement of the shaft and spacing the gear axially from the bearing as evidenced in FIGURE 10.

The ratchet mechanism includes the ratchet wheel 129, above referred to, and will now be described. The drive shaft bearing 125 is provided with an exterior slot 130 extending longitudinally throughout its length and an elongate planar pawl member 131 is disposed in this slot for rockable or tiltable movement in the plane of the drive shaft. The inner end of the pawl is provided with a detent portion 132 for successively engaging, preferably six teeth 133, on the ratchet wheel. The pawl is also provided with a notch 134 and a reduced outer end 135 forming a shoulder 136. The bearing is also provided with an exterior transverse groove 137 and a resilient means preferably in the form of a wire spring has an annular portion 138 which is disposed in the annular groove and bears against the reduced end 135 of the pawl and the shoulder 136. The spring also includes an offset loop portion 139 disposed in a plane substantially tangent to its annular portion and the bearing and further includes a hook portion 140 which is disposed in the notch 134 and embraces the pawl as shown in FIGURES 1 and 10. With this setup the pawl is resiliently held in the slot so that its detent portion will be caused to readily engage the teeth on the ratchet member to positively prevent the drive shaft and gear thereon from rotating in a reverse direction. It will be noted that the inner end of the bearing is preferably tapered adjacent to ratchet wheel in order to provide a suitable clearance space for movement of the detent portion of the pawl.

In view of the foregoing it will be manifest that when the pickup assembly is in a normal retracted operating position relative to the spool, with the cam 81 of the pickup lever 57 engaging the cam 100 on the ring 89, as exemplified in FIGURE 1 of the drawing, the convex line engaging portion or surface 84 of the pickup lever will be extended to catch and direct the line 27 onto the spool when the driving means is operated. In other words, the control lever 40 is held outwardly due to its finger 39 riding on the peripheral surface 34 of the bearing and thereby forces and holds the pickup lever outwardly or in the extended line retrieving position shown. It will be noted that when a cast is to be made, the actuator 6 is depressed to force the pickup assembly, through the agency of the actuating means, to its foremost forward position as evidenced in FIGURE 3, in which position the pickup lever is still held extended by the force applied to the cam 81 thereon by the cam on the ring 89. If the drag means 10 has been adjusted or set by the drag control 55 so that the pickup drum is substantially locked against rotation on the shaft 41, then the pickup lever will prevent release of the line from the spool. However, if the adjustment of the drag means is set to permit rotation of the drum on the shaft, then the pickup lever while extended and engaging the line will allow the pickup assembly to rotate relative to the shaft when there is an outward pull on the line. The frictional resistance offered by the drag means to outward pull or flow of the line may, of course, be varied, as desired, by merely manipulating the control 55.

More particularly, when the pickup assembly is being shifted to its foremost forward position, the actuator 6 engages the bridge 90 of the actuating means to effect movement of the pickup assembly and shaft as a unit until the shoulders 94 on the rods 88 engage the wall 25 of the rear spool part 21, and as the unit approaches or reaches the foremost position limited by the shoulders, the finger 39 on the control lever rides off the peripheral surface 34 of the bearing into engagement with any one of the radial surfaces 36 and 38, since the support afforded by such peripheral surface is removed from the control lever. When this support is removed the control lever is automatically swung inwardly by the spring 58 relative to the pickup lever so that the finger 39 will engage any one of the aforesaid surfaces and thereby temporarily detain the pickup assembly in the forward position. When pressure is removed from the actuator 6, the actuating means will automatically retract to the position of FIGURE 5 through the action of the springs 91 which were previously compressed when the pickup assembly was shifted forwardly.

Rearward movement or retraction of the actuating means will also cause the cam on the ring 89 to disengage the cam 81 on the pickup lever and allow this lever to automatically swing inwardly through the action of the spring 59 so that its lug 80' will engage the finger 39 on lever 40 and thereby locate the outer end or line engaging portion 84 of the pickup lever within the confines of the pickup drum 53, as depicted in FIGURE 5, so the line may freely escape or peel off the spool, over the annular side wall or flange 60 of the drum, spirally about the control 55 and out through the opening 9. It will be noted that the retraction of the pickup lever can take place only when the pickup assembly is shifted to its foremost position to locate the drum in advance of the throat of the spool. The fact that the lever travels about the control 55 between its periphery and the annular edge of the material defining the opening 9 assists in controlling the flow of line to and from the spool to substantially prevent line twist and entanglement. It will be noted that the junction between the side wall 60 and inclined portion or wall 63 of the drum is preferably rounded in order to reduce line wear and the same is true of the material defining the opening 9 in the cover.

It will be further manifest that when the pickup assembly is temporarily detained in its foremost forward position by the control lever and the actuating means and pickup lever are retracted as depicted in FIGURES 5 and 11, that the actuator may be depressed to shift the actuating means to cause the cam 100 on the ring to engage the cam 81 on the pickup lever to force the lever outwardly through the opening 61 in the side wall of the drum for engaging the line to stop or retard its flow from the spool depending on the condition or adjustment of the drag means. Attention is directed to the fact that the pickup lever 57 in this situation is movable independently of and relative to the control lever, since the latter is held against one of the surfaces 36 and 38 by the action of the spring 58 in a non-coacting relation to the lever 57. Otherwise expressed, the outflow of the line is subject to the controlling action of the pickup lever and drag means. This unique combination or compounding of actions has proven very efficient under all conditions of use and substantially prevents line twisting due to any slippage occurring in the drag means. This setup is particularly distinguishable from the line clamping means disclosed in commercial use in which the line is clamped between a drum and a cover. This factor is important as line clamping ultimately distorts the line and results in breakage.

The pickup assembly may be readily and quickly automatically returned to its operative line winding position of FIGURE 1 by merely turning the crank 127 of the driving means to rotate the pickup assembly so that if, for instance, the finger 39 were engaging one of the radial surfaces 38 and the peripheral surface 35 of the reduced cylindrical portion 33 of the bearing, as shown in FIGURE 5, it will be caused to fall back onto one of the radial surfaces 36 in order that the adjacent axial surface 37 will gradually swing the control lever outwardly and carry the pickup lever therewith until the finger 39 rides onto the peripheral surface 34 of the enlarged cylindrical portion 32 of the bearing to enable the pickup assembly to automatically retract to the positions of FIGURES 1 and 6 through the action of the spring 51. On the other hand, if the finger 39 was previously engaging one of the radial surfaces 36, rotation of the pickup assembly will cause a radial surface 37 to swing the levers outwardly until the finger 39 rides onto the peripheral surface 34 to enable automatic retraction of the pickup assembly to the position of FIGURE 1 with the pickup lever engaging the ring of the actuating means. Attention is directed to the fact that the finger 39 of the lever 40 is always in engagement with the peripheral surface 35 of the reduced portion 33 of the bearing whenever the finger is bearing against any one of the surfaces 36 and 38. It snould be noted that the control lever is not limited in action by the stop 77 therefor until the drum is removed from the driven shaft 41. In other words, this stop serves to maintain the levers in their respective positions to facilitate attachment of the pickup drum to the shaft.

The modified pickup assembly illustrated in FIGURES 16 and 17 includes a drum 200, a control lever 201, a pickup lever or member 102, and a spring 203 for the lever 201, which correspond to those above described. The spring is anchored to the drum by a stud 204 and cooperates with the control lever as alluded to above, and a stop 205 is provided for this lever. Attention is directed to the fact that a fingered tension spring or washer 206 is utilized to apply an axial thrust or force against the pickup lever in lieu of a radial thrust when a spring such as 59 is utilized.

More particularly, a stud 207 extends through the drum and the levers. This stud includes a reduced end portion 208 secured in an aperture in the drum by upsetting as shown, a cylindrical portion 209 disposed in a hole provided in the control lever 201, a relatively large cylindrical spacer portion 210 overlying the lever 201, and a reduced end portion 211 extending through the pickup lever and the spring washer and which is upset to secure this lever and the washer to the stud between the portion 210 and the upset, with the washer compressed to exert an axial thrust or bias against the pickup lever. With this organization, the pickup lever will normally be held in any pivoted position to which it has been pivoted until it is subsequently pivoted, as distinguished from the action produced by the spring 59 to normally force the lever inwardly toward the longitudinal axis of the reel. The spring washer is not required to move the lever—it merely serves to hold the lever in position after it has been moved by the line. In other words, each of the springs 59 and 206 serve as counterbalancing springs to prevent the pickup lever from falling into the path of the line when a cast is made. The pickup lever is retracted by line movement and pressure at the start of a cast while the pickup assembly is held forwardly by the control lever. This setup is important and constitutes a significant advance in line winding as distinguished from certain constructions presently in commercial use in which a biased radially movable pin is ofttimes locked by line pressure to prevent casting.

Referring more particularly to FIGURES 18, 22, 23 and 24, the reel may be briefly described as comprising a frame generally designated 301, a reciprocably mounted spool 302, a line control assembly 303 mounted on a driven shaft 304 for controlling a line 305, actuating means 306 attached to the spool, driving means 307 operatively connected to the actuating means and to the driven shaft for simultaneously reciprocating the spool and rotating the shaft and control assembly as a unit, shiftable means 308, an actuator 309 for manually operating the shiftable means to move the latter including the aforesaid unit forwardly, and a drag assembly 310 operatively connected to the control assembly and driven shaft and extending into a relatively large opening 311 provided in a cover 312 for regulating a drive and release connection between the control assembly and the shaft.

The reel frame includes a cup formation 313 and an attaching portion 314 joined to the cup by a post 315. The cup comprises an annular wall 316 and a vertical base wall structure 317 provided with a large vertical clearance opening 318. It may also be stated that the frame includes the wall structure 317 from which the annular wall 316 projects. The frame is provided with an upper integral rearwardly extending formation 319 having a recess 320 therein defined in part by an overhanging horizontal wall 321 and a pair of vertical walls 322 having aligned holes therein which receive an elongate pivot means or screw 323 which pivotally supports the actuator 309. The frame also includes a lower integral formation 324 extending rearwardly from a junction between a lower portion of the wall structure 317 and the upper portion of the post. This lower formation is spaced appreciably below the upper formation and comprises a generally horizontal wall portion 325 having an inclined continuation 326. The edges of the lower formation are reenforced and provided with pairs of aligned internally threaded apertures.

A pair of substantially corresponding side plates 327 and 328 are detachably secured against the sides or edges of the upper and lower formations. The side plate 327 carries the driving means 307 and is provided with two lower holes through which a pair of screws 329 extend and respectively connect with a pair of the threaded apertures in one of the edges of the lower formation. The other side plate 328 is similarly provided with a pair of holes through which screws (not shown) extend into the other pair of threaded apertures in the opposite edge of the lower formation. The side plate 327 is also provided with an upper hole and the side plate 328 with a threaded hole and the elongate pivot screw 323 extends through the hole in the side plate 327, through the aligned holes in the side or vertical walls 322 of the upper formation 319 and connects with the threaded hole in the plate 328. The elongate screw also extends through a hole 330 in a forwardly extending offset 331 of the actuator 309 to pivot the actuator as alluded to above and in combination with the screws 329 detachably connects the actuator and side plates or members 327 and 328 to the frame.

The post 315 of the reel frame is preferably made in the form of a channel having a vertical wall 332 and a pair of rearwardly extending parallel side walls 333 joining the cup 313 and the attaching portion 314. A vertical rib 334 joins the cup, vertical wall 332 of the channel and the portion 314 throughout an appreciable portion of the length of the latter. With this unique arrangement, the cup and portion 314 are rigidly joined to impart strength thereto including the frame.

Figure 19:
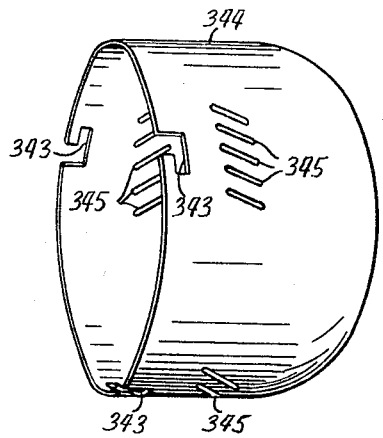
FIGURE 19 is a pictorial view of a cover of the reel.
Figure 22:
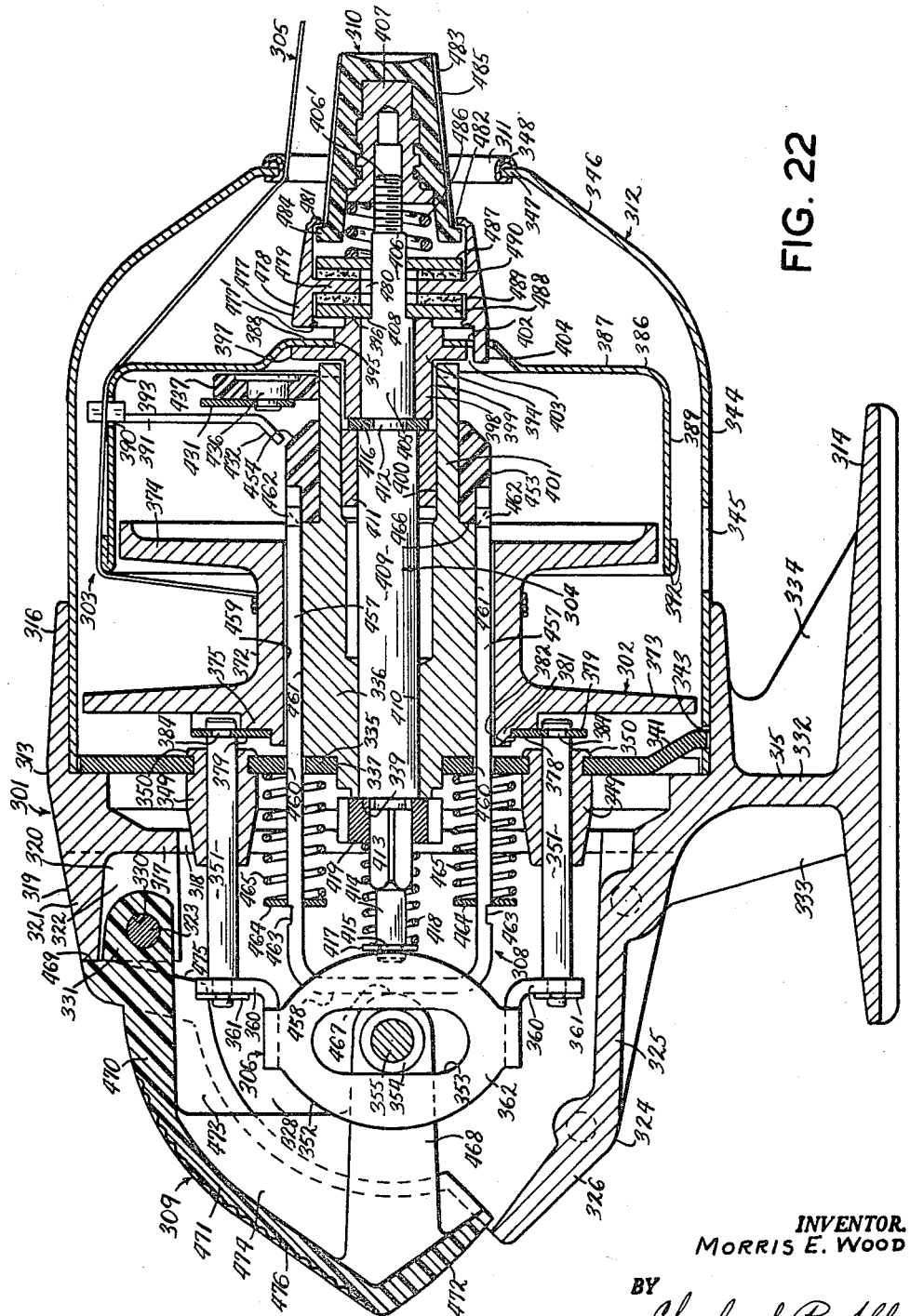
FIGURE 22 is an enlarged vertical sectional view of the reel showing the line control assembly in a line winding position.
Figure 24:
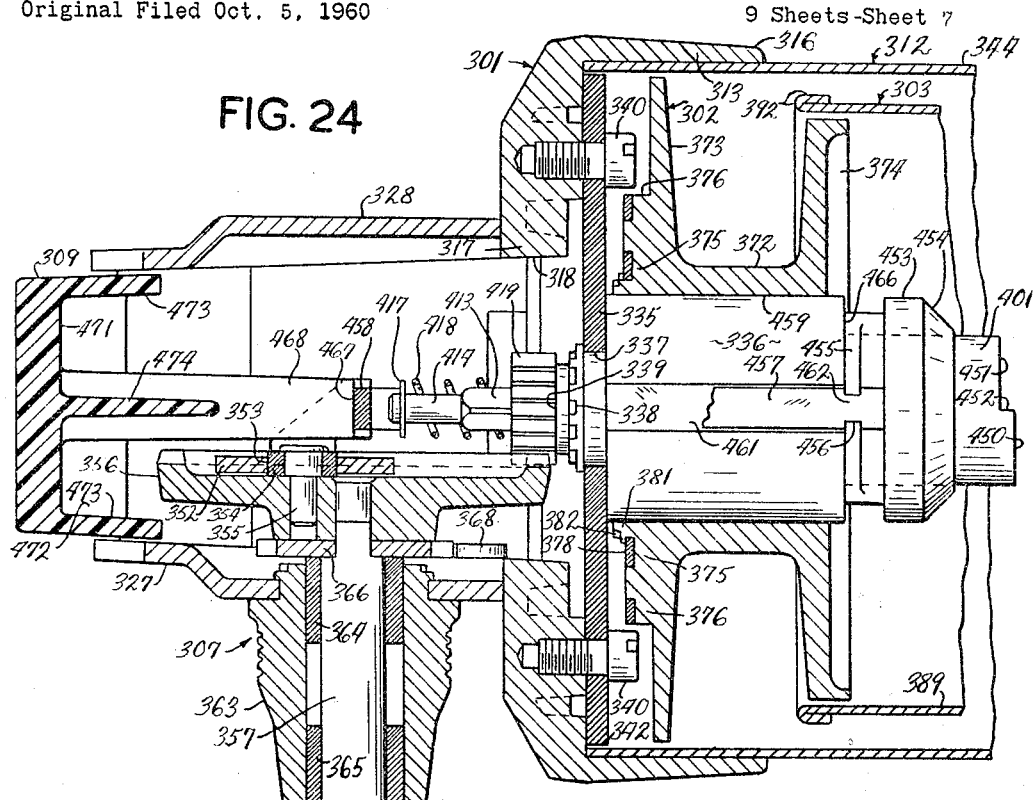
FIGURE 24 is an enlarged partial horizontal section depicting structural details of the driving means and mounting unit for the driven shaft and spool.
Figure 25:
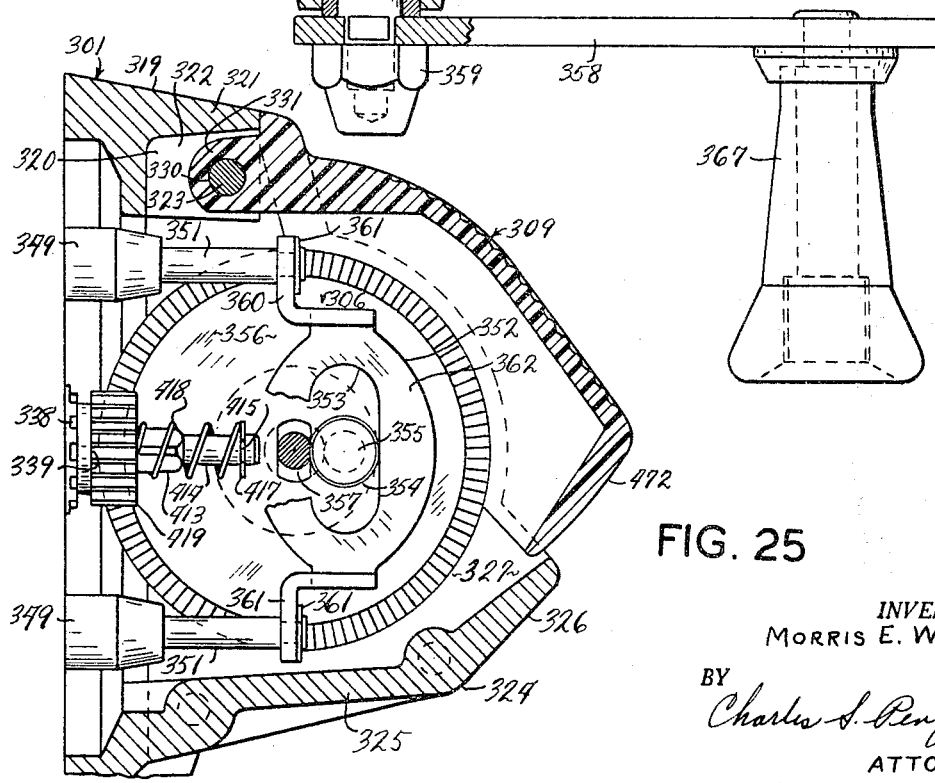
FIGURE 25 is an enlarged partial vertical section depicting details of an actuator for manipulating the line control assembly.

A mounting unit is connected to the frame for supporting the spool 302, driven shaft 304, shiftable means 308 for the line control assembly and the actuating means 306 connected to the driving means 307 for reciprocating the spool. The mounting preferably comprises an annular plate 335 and a relatively large tubular bearing 336 having an inner reduced end which is permanently secured in a central hole 337 provided therefor in the plate by upsetting as indicated at 338 and provided with an abutment 339 as shown in FIGURE 24. The plate 335 is detachably held in the cup against the base wall structure 317 of the frame by a pair of diametrically disposed screws 40 which extend through the plate and connect with threaded holes provided therefor in such structure. The plate is also preferably formed with three identical integral resiliently flexible radially extending tongues 341 which are circumferentially spaced apart 120 degrees for engaging the inner periphery of the cup to assist in centering the position of the plate. The free ends of the tongues project beyond the periphery of the plate, which periphery is concentrically disposed in relation to the inner periphery of the cup to provide an annular space 342 as evidenced in FIGURE 27. The tongues are preferably curved or so shaped that they are resiliently detachably received in three bayonet slots 343 provided in a cylindrical wall 344 of the cover 312 as depicted in FIGURES 19 and 22. The cylindrical wall 344 is received in the cup in the annular space 342 about the plate. The wall 344 is also preferably provided with a series of openings 345 to assist in air conditioning the interior of the reel to permit escape of water and promote line drying. The cover has a conical portion 346 and an end wall 347 provided with the opening 311 defined by an annular edge which is embraced by a ring or guide 348 constructed of a suitable hardened material to reduce line wear.

Figure 23:
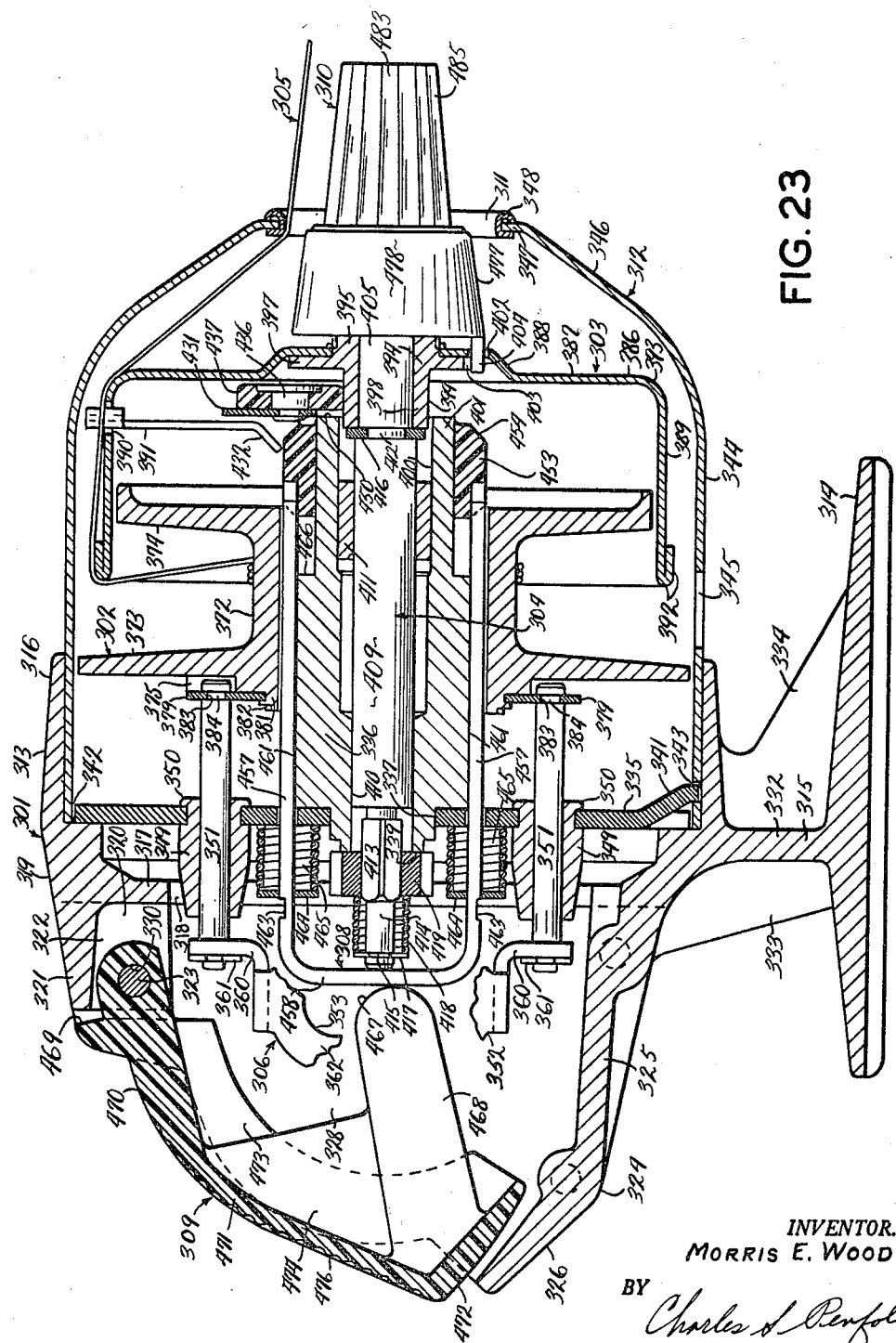
FIGURE 23 is an enlarged vertical sectional view showing the line control assembly shifted to a forward position for casting.

The plate 335 is further provided with a pair of diametrically disposed holes in which the reduced ends of a pair of rearwardly extending tubular bearings 349 are permanently fastened by upsetting as indicated at 350 in FIGURES 22 and 23. These bearings support a pair of slidable rods 351 having fore ends which are detachably connected to the spool and rear ends detachably connected to a follower 352. The follower is provided with an elongate guide or slot 353 which slidably receives a roller 354 journalled on a stud 355 eccentrically fixed on the inner side of a drive gear 356 carried by a drive shaft 357 rotatable by a crank 358 connected thereto by a nut 359. The reduced rear ends of the rods extend through holes provided in offsets 360 formed on the follower and are preferably detachably held by lock washers 361 which snap engage with grooves in such ends, as evidenced in FIGURE 23. The follower includes a planar wall 362, in which the slot 353 is provided, and bears against an inner planar face of the drive gear 356 to assist in stabilizing the movement of the follower. The rods and follower constitute components of the actuating means 306 which, as stated above, operatively connects the driving means and the spool to effect smooth reciprocating motion to the latter while the line control assembly is rotating to level wind line onto the spool. The mode of attaching the rods to the spool will be described subsequently.

The side plate 327 carries a tubular bearing 363 through which the drive shaft 357 extends. This bearing is provided with an inner reduced end which is permanently secured in a hole provided therefor in the plate 327 by upsetting as shown in FIGURE 24. A pair of axially spaced bushings 364 and 365 are preferably press-fitted into the bearing and journal the shaft. The inner bushing 364 is preferably secured so that its inner end projects beyond the upset for engaging a ratchet wheel 366 keyed to the drive shaft and the outer bushing 365 is secured with its outer end disposed beyond the bearing 363 for engaging the crank 358 on the shaft. The crank is preferably conventionally keyed to the shaft and a handle 367 is carried by the crank.

The drive gear and ratchet wheel are also keyed in a well known manner to the inner end of the drive shaft by preferably squaring such end and fixedly securing it in central squared axially aligned openings in the gear and ratchet wheel, with the wheel arranged between the gear and inner bushing 364. A pawl 368 is pivotally mounted on a stud 369 fixed on the side plate 327 and includes a relatively short arm 370 for selectively engaging teeth on the wheel and a longer arm 371 which is of a length and size and so located with relation to the other arm, stud and teeth that the pawl is normally urged in a counter-clockwise direction as viewed in FIGURE 18 to cause the lower arm to selectively engage the teeth when the crank is turned in a clockwise direction. In other words, the arms cooperate with the teeth to permit turning of the drive shaft in a clockwise direction but not in a reverse direction. It will be noted that the side plate 327 is preferably dished to provide a recess or pocket within which the ratchet wheel is partially disposed.

The spool or line support 302 is preferably moulded and may be constructed of any suitable material. It has a hub 372 freely slidable on the bearing 336, a rear annular flange 373 and a front annular flange 374 which is somewhat smaller in diameter than the rear flange. The rear side of the spool is preferably formed with a boss 375 having integral diametrically disposed radial portions 376 provided with axial locating projections 377. A metal ring 378 is preferably located in a predetermined relation to the boss by the projections which extend into holes 380 provided therefor in radial portions 379 of the ring, as shown in FIGURES 30 and 31. The spool is also provided with a short rearwardly extending tubular portion 381 which extends through the ring and is upset as indicated at 382 in FIGURES 22 and 30 to anchor the ring to the spool. The radial portions 379 of the ring are preferably of a size somewhat larger than the radial portions 376 of the boss and provided with slots 383. These slots are circumferentially spaced from the boss portions 376 and detachably receive reduced portions 384 on the fore ends of the rods 351 as depicted in FIGURES 30 and 31. The ring is preferably provided with inclined yieldable fingers 385 which assist in resiliently locking the rods into firm pressure holding relationship with the ring. With this unique arrangement, after the cover and line control assembly are successively removed, the spool, which is held against rotation by the rods 351, can be released therefrom by merely manually rotating it in a counterclockwise direction as viewed in FIGURE 30. It should be noted that the distance between the fore ends of the rods and the reduced portions 384 is substantially the same as the distance between the rear face of the rear flange 373 of the spool and the radial portions 379 of the ring so that the spool can be readily detachably connected to the rods at any point within their range of reciprocation. In other words, there is a gauging in the connecting relationship between the rods and spool. Attention is directed to the fact that the front and rear flanges of the spool are preferably axially spaced apart a greater distance than the flanges of spools in some other reels of this type and that the diameter of the hub 372 is also somewhat larger, the purpose of which is to promote release of the line from the spool and provide a larger supporting area for the line. This arrangement also reduces the radial depth of coiled line and consequently assists in preventing line entanglements.

The line control assembly 303 and mode of attaching the same to the driven shaft 304 will now be described. This assembly, which is detachably connected to the driven shaft by the drag assembly 310, preferably comprises a drum or cup 386 having a front or base wall 387, with a circular depression 388 therein, and an annular or cylindrical side wall 389 provided with a circumferential slot or opening 390 through which a line control element 391, constituting an active component of the control assembly, may be projected. The rear free marginal edge portion of the side wall 389 is preferably folded back upon the outer surface of the wall to form smooth convex and planar line engaging surfaces 392 over which the line may travel to and from the spool in order to reduce line wear and space the line appreciably from the remaining outer peripheral surface of the wall between said engaging surfaces and a curved or convex surface 393 formed at the junction between the side and front walls as depicted in FIGURE 22.

Figure 20:
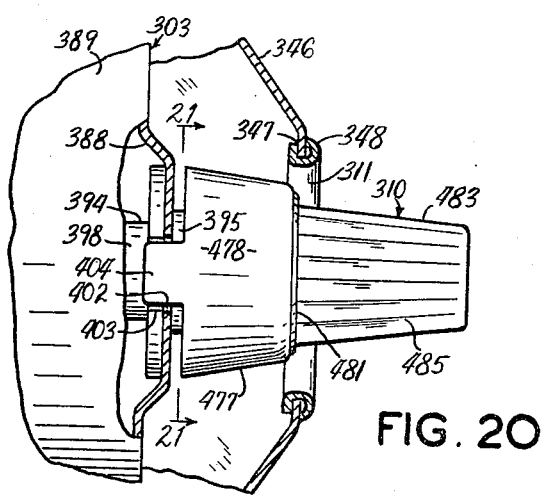
FIGURE 20 is a side elevational view of a part of the reel, with portions in section and portions broken away to illustrate a drag assembly operatively associated with the line control assembly and a driven shaft carrying both assemblies.

A tubular fitting 394 is permanently fixed on the drum for movement therewith. This fitting, among other things, serves to stabilize the drum and has a portion 395 secured in an opening in the depression 388 by upsetting and is provided with an abutment 396 as depicted in FIGURE 36. The fitting also includes a relatively large annular flange 397 seated in the depression and a rear cylindrical portion 398 having a peripheral bearing surface 399. The cylindrical portion is adapted to normally extend into a counterbore 400 provided in a forwardly extending reduced cylindrical extremity 401 of the bearing 336 when the control assembly 303 is in a retracted or line winding position as evidenced in FIGURE 22. As depicted in FIGURES 20 and 22, the depression 388 of the drum and the flange 397 on the fitting 394 are respectively provided with diametrically disposed aligned apertures 402 and 403 for detachably receiving a pair of axially extending projections 404 on the drag assembly 310, above referred to, the latter of which will be described more in detail subsequently.

The control assembly 303, as shown in FIGURE 22, is mounted on the driven shaft 304 for reciprocation therewith and for rotation therewith or for rotation relative thereto depending on the condition of the drag assembly. The driven shaft includes a relatively short cylindrical portion 405 disposed in the tubular fitting 394, a non-circular portion 406 located in advance of the portion 405 which is surrounded by components of the drag assembly 310, and a threaded end 406' which connects with a nut 407 of the assembly for attaching the latter to the shaft and holding the control assembly 303 on the shaft. A pair of shoulders or abutments 408 are formed on the shaft at the junction between the cylindrical and non-circular portions 405 and 406.

The driven shaft also includes an elongate cylindrical portion 409, somewhat larger in cross-section than the portion 405, and is journalled in an inner portion 410 of the bearing 336 and in a bushing 411 of the oilless type secured in the counterbore 400 in the bearing in axially spaced relationship to the inner portion 410 to stabilize the motion of the shaft. It will be noted that the bearing between its inner portion 410 and the bushing 411 is bored to reduce friction between the shaft and bearing at this location. The shaft further includes a reduced portion 412 located between the cylindrical portions 405 and 409, a squared portion 413, and a rear end 414 provided with a reduced portion 415. An abutment, preferably in the form of a spring clip or washer 416 is detachably engaged with the reduced portion 412 and is interposed between the bushing 411 and the inner end of the fitting 394. The bushing is adapted for engagement by the clip 416 to limit rearward movement of the control assembly and shaft as a unit and locate the control assembly in a retracted normal line winding position. A similar abutment 417 is detachably engaged with the reduced portion 415 for holding a helical spring 418 and a pinion gear 419 on the shaft. The squared portion 413 of the shaft is of a length to support the gear 419 for slidable but non-rotative movement relative to the shaft and the spring serves to normally press the gear against the abutment 339 formed on the inner end of the bearing 336 and in mesh with the drive gear 356 and urge the aforesaid unit rearwardly so that the clip engages the bushing to maintain the unit in the line winding position just referred to. The shaft 304 and control assembly 303 are adapted to be shifted forwardly as a unit by manipulating the actuator 309 in a manner which will be later described.

Referring more in detail to the structure of the line control assembly 303, exemplified in FIGURES 32 through 36, the front wall 387 of the drum is provided with a fixed rearwardly extending stud 420 which supports the line control element 391. This stud includes a cylindrical portion 421 engaging the rear side of the front wall 387 of the drum, an intermediate larger cylindrical portion 422, an adjacent cylindrical portion 423, similar to the portion 421, a reduced portion 424, and a reduced portion 425 which is secured in a hole provided therefor in the wall 387.

The line control element 391 preferably includes a pair of arms 426 and 427, disposed generally in a right angular relationship and in substantially the same plane, which plane is parallel to the plane of the front wall 387 of the drum 386. The free end of the arm 427 is provided with an aperture which receives the cylindrical portion 423 of the stud 420 for pivotally connecting the element thereto. A fastener or spring clip 428 engages the reduced portion 424 of the stud for detachably connecting the element thereto. The free end of the arm 427 is also provided with a forwardly extending lug 429 which is disposed in a predetermined spaced relation to a lug 430 provided on a control member or lever 431, also carried by the stud. The element 391 at the junction between its arms is further provided with an outer rearwardly extending angularly disposed finger 432 and with a forwardly extending projection 433 located between the arms. The free end of the arm 426 is preferably provided with an integral portion which is folded or turned over in parallel relation to the arm to form an elongate convex surface 434 for engaging the line when such arm is moved outwardly through the slot or opening 390 provided in the side wall 389 of the drum.

The control member or lever 431, as stated above, assists in controlling the operation of the line control element 391. This lever has an end provided with an aperture which receives the cylindrical portion 421 of the stud 420 to pivotally connect the lever thereto and due to the relative sizes of the portion 421 and the intermediate portion 422 of the stud, the lever is permanently connected to the stud. The opposite and free end 435 of the lever is offset rearwardly in a plane substantially parallel to the plane of the front wall of the drum and carries a forwardly extending stud 436 on which is journalled a movable abutment preferably in the form of a plastic roller or wheel 437. The free end of the lever is also provided with an abutment preferably in the form of a forwardly extending flange 438 having a continuation or angularly disposed finger 439 thereon pointing generally toward the rear cylindrical portion 398 of the fitting, bevelled to provide clearance and/or stabilize movement of the lever by riding against the inner surface of the front wall of the drum. The roller may be constructed of a plastic, like nylon, or of any material suitable for the purpose. Also, it may be made of metal or in the form of a curved abutment, as distinguished from the roller shown, and its contacting surface can be treated with Teflon to reduce friction.

Resilient or biasing means, preferably in the form of a pair of similar springs 440 and 441, are utilized to respectively normally urge the line control element 391 and the control lever 431 in counter-clockwise directions toward retracted positions when viewed as in FIGURES 32, 33 and 34. The spring 440 has a coil 442 which surrounds the intermediate portion 422 of the fixed stud 420, a hook portion 443 engaging the notch in the lug 429 on the control element and an offset elongate portion 444 having a free end 445. The elongate portion 144 engages the projection 433 on the element and crosses the arm 426 and the free end engages the inner surface of the side wall 389 of the drum. With this organization the spring 440 provides an effective pressure against the projection 433 of the element to urge the latter in the counter-clockwise direction previously mentioned and also urge the projection 433 against an edge of the lever 431 and thereby augment the urging of the spring 441 against such lever. The other spring 441 has a coil 446 surrounding the stud, a hook 447 engaging the lug 430 on the lever 431 and an offset elongate portion 448 with a free end 449 engaging the inner surface of the drum wall 389 to urge the lever in the said counter-clockwise direction. It will be noted that the elongated portions of both springs underlie the arm 426 of the line control element and are disposed between the element and lever as depicted in FIGURES 32, 33 and 34. With this unique setup, and as will be described hereinafter, the control element can be pivoted about the axis of the stud 420 independently of the lever to locate the line engaging surface 434 on the element outwardly through the slot 390 or to a retracted position within the confines of the drum and that the lever can also be pivoted about said axis which is parallel to the longitudinal axis of the reel. It will be further manifest that any movement of the lever clockwise or counter-clockwise will simultaneously impart a corresponding movement to the control element. Although the control element may be biased by the spring 440 when the control assembly is in a certain position, it is not essential that the element be biased to move it out of the path of the line at the beginning of a cast. In other words, this spring primarily serves to counterbalance the weight of the element and temporarily maintain it in whatever position it is moved or retracted by the line.

One or both of the springs 440 and 441 may be instrumental in urging the roller 437 against the peripheral surface 399 of the cylindrical portion 398 of the fitting 394 when the line control assembly 303 is removed from the reel. The roller is also adapted to engage the surface 399 when the control assembly 303 is shifted forwardly by the shiftable means 308 through the agency of the actuator 309 as evidenced in FIGURES 23 and 33. When the assembly is in the normal line winding position as illustrated in FIGURES 22 and 32, the roller will rotate about the axis of the stud 436 and ride on the periphery of reduced portion 401 of the bearing 336 to maintain the arm 426 of the control element 391 extended through the slot 390 in the control drum 386 so that the line engaging surface of the element will engage the line 305 and direct it onto the spool 302. The reduced portion 401 of the bearing 336 is also preferably provided with an arcuate end surface 450 and an adjacent arcuate surface 451 disposed rearwardly in axially spaced relation to the surface 450, with diametrically spaced axially extending abutments or surfaces 452 and 452' formed between surfaces 450 and 451. These surfaces may be engaged by the roller for influencing movement of the lever to position the control element in a manner which will be explained more in detail subsequently.

The shiftable means 308 for moving the unit comprising the control assembly 303 and driven shaft 304 forwardly will now be described. The shiftable means may be designed and constructed in various ways but as depicted includes an annular cam member 453, preferably made of plastic, such as nylon, which is slidably mounted on the reduced fore extremity 401 of the bearing 336. This member is provided with a frontal conical cam surface 454 which is adapted to engage the finger 432 on the control element 391 when the member is moved manually forwardly by the actuator 309. The member 453 also includes a rear cylindrical portion provided with diametrically disposed radially extending formations 455 haivng notches 456 therein. A generally U-shaped member or yoke has a pair of parallel legs 457 and a connecting portion 458 joining the legs. The connecting portion is located at the rear of the mounting plate 335 and the legs extend forwardly through a center hole 459 in the hub 372 of the spool 302, through apertures 460 provided therefor in the plate 335 and into diametrically disposed longitudinally extending guideways or grooves 461 provided in the bearing 336, which grooves are aligned with said apertures. The legs are located substantially within the confines of the grooves and the free ends of the legs are preferably provided with reduced portions 462 which interconnect with the notches 456 in the radial formations on the cam member whereby the latter will move in unison with the yoke. The legs adjacent the connecting portion are preferably deformed to provide abutments 463 which are engaged by washers 464 on the legs and helical springs 465 respectively surround the legs and bear against the washers and mounting plate to normally maintain the shiftable means in a fully retracted position limited by the cam member engaging an annular shoulder 466 or abutment on the bearing 336 to preferably locate the connecting portion 458 of the yoke in spaced relation to the rear end 414 of the driven shaft 304. The springs also serve to more or less urge the portion 458 in bearing engagement with a rounded end 467 of a rearwardly extending pressure applying finger 468 on the actuator 309 and maintain an abutment 469 on the offset portion 331 on the actuator against the free end of the overhanging wall 321 of the frame as depicted in FIGURE 22. It will be noted that the yoke, driven shaft 304, rods 351 and bearings 349 therefor, springs 465 and pinion gear 419 are either disposed in or move in the clearance opening 318 in the wall structure 317 of the reel frame.

The actuator 309 for operating the yoke or shiftable means includes an upper wall 470, an elongate inclined wall 471, a lower shorter wall 472 disposed at an angle to the inclined wall, and a pair of corresponding side walls 473. The free end of the upper wall is provided with the offset 331 having the hole 330 therein which receives the pivot screw 323. The pressure applying finger 468 extends forwardly from the junction between the inclined wall 471 and lower wall 472 of the actuator and in general axial alignment with the driven shaft 304 for normally engaging the connecting portion 458 of the yoke as shown in FIGURE 22, in which position a free edge of the lower wall 472 is disposed inside the frame in overlapping relationship with the inclined continuation 326 of the frame. The finger is preferably reenforced by a medial rib 474. With this arrangement the actuator substantially fills a space defined by the upper and lower rearwardly extending formations 319 and 324 of the frame and the side plates 327 and 328 engaging the sides or edges of formations. It will be noted that the free end of the upper wall of the actuator is bevelled at 475 to provide clearance so the actuator can be depressed and the outer surface of the elongate wall of the actuator is provided with serrations 476 to prevent a digit of the hand from slipping when the actuator is depressed. It should be further noted that the actuator, due to the location of its pivotal connection with the frame and weight, normally assumes a position with the pressure finger engaging the yoke. The actuator may be depressed to an extent limited by the collapse of the helical spring 418 on the driven shaft as evidenced in FIGURE 23. The finger on the actuator 309, yoke, rods 351, and driven shaft 304 are all movable in a single plane alongside of and in parallel relation to the plane of the offset planar base 362 of the follower 352 and drive gear 356.

The drag control assembly 310, as best shown in FIGURE 22, will now be described more in detail. It includes a housing 477 provided with the projections 404, alluded to above, which register with the apertures 402 and notches 403 in the depression 388 of the drum and flange 397 of the fitting 394 for keying the housing or assembly for rotation with the line control assembly 303. The housing has a tapered cylindrical side wall 478, an internal partition or radial wall 479 provided with an opening 480 receiving the non-circular portion 406 of the driven shaft, and an end wall 481 provided with an opening 482 in which a handle or knob 483 extends, with a radial flange 484 of the knob engaging an inner surface of the end wall 481. The knob is preferably tapered and provided with exterior longitudinally extending serrations or flutes 485 to facilitate turning of the knob on the driven shaft and relative to the housing. The nut 407 is preferably moulded or embedded in the knob for engaging the threaded end 406' of the driven shaft. This nut is disposed inwardly from the flange 484 to provide a space for receiving an outer end of a helical spring 486 which engages the nut. The spring surrounds the shaft and its inner end engages a friction member 487, preferably of metal, keyed to the non-circular portion 406 of the shaft and located forwardly of the radial wall 479 of the housing. A corresponding friction member 488 is also keyed to the non-circular portion of the shaft and located at the rear side of the partition 479 and engages the abutment 396 on the fitting 394 and shoulders 408 on the shaft. A pair of identical friction elements 489 and 490, preferably of leather or equivalent material, are respectively interposed between the radial wall 479 and the friction members 487 and 488 for frictionally engaging this wall and members, all for the purpose of providing a releasable friction driving connection between the control assembly 303 and the driven shaft. The friction member 488 and friction element 489 are preferably permanently held in the housing by upsetting a portion of its rim against the member 488 as indicated at 477' and the friction member 487, friction element 489 and spring 486 are preferably permanently held between the partition 479 and knob in view of the relationship between the wall 481 of the housing and flange 484 of the knob, which wall and flange also serve to preferably hold the housing and knob assembled. The spring 486 normally offers some clamping pressure and this pressure and others may be varied by manipulating the knob to cause the control assembly 303 to rotate with the shaft for winding the line onto the spool and also permit the assembly to reversely rotate relative to the shaft when the outward pulling force on the line exceeds the resistance offered by the drag assembly and the driven shaft and drive gear are held against reverse rotation through the agency of the ratchet mechanism. The use of a reversely rotatable line control assembly with a normally non-rotatable but reciprocating spool serves to prevent line twist and entanglement.

The drag assembly is readily removable from the driven shaft and since it is a self-contained unit, there are no loose or separate components which can be lost during assembly and disassembly of the reel. The guide opening in the cover affords ready access to the knob of the drag assembly and the size of the knob and opening are such that an annular space is provided through which the line travels.

Considering now the operation of the reel and referring particularly to FIGURES 22 and 32, rotation of the driving means will cause rotation of the line control assembly 303 in a clockwise direction to direct the line onto the spool while the latter is reciprocating to assist in level winding the line thereon. During the the line winding operation, the outer end of the control element 391 is held in an extended position through the opening 390 in the drum to present its surfaces 434 for engagement with the line. The element is held in this position by the control lever through its roller engaging the peripheral surface of the bearing 336 and an edge of its outer end 435 engaging the projection 433 on the control element. The spring 441 serves to urge the roller against the said peripheral surface and the spring 440 urges the projection 433 against the lever. The roller materially reduces the friction against the bearing caused by the load imposed by the line.

To conduct a cast, the actuator 309 is progressively depressed to move the cam member 453 forwardly to cause its cam surface 454 to engage the finger 432 of the control element and then bring the connecting portion 458 of the yoke into engagement with the driven shaft 304 to move the latter and line control assembly 303 as a unit to a position whereby the roller 437 slips off the periphery of the bearing 336 and flips back against the periphery 399 of the fitting 394 on the drum. During this forward shifting of the unit the control element 391 is held extended through the opening 390 to engage and prevent the line from unwinding from the spool. In other words, the cam member supports the control element in the extended position in lieu of the lever when its roller is not in engagement with the periphery of the bearing. When the pressure being applied to the actuator is removed for the cast, the spring 418 on the driven shaft, which has previously been compressed by the forward movement of the unit, automatically moves the unit rearwardly until the roller engages the arcuate end surface 450 of the bearing 336 to stop or limit such movement and thereby maintain the unit in a predetermined forward position. Also, removal of such pressure will cause the springs 465 on the yoke of the shiftable means 308, which were previously compressed due to the pressure, to automatically retract the shifting means to disengage the cam member 453 from the control element, whereupon the counterbalancing spring 440 will automatically return or retract the element to a position substantially within the confines of the drum and thereby free the line for the cast as illustrated in FIGURE 33.

When one desires to stop the outflow of the line at the end or during a cast, the actuator may again be depressed to effect engagement between the surface 454 on the cam member and finger 432 on the control element to cam and pivot the latter to the extended position into the path of the line and thereby prevent the line from uncoiling from the spool.

To retrieve the line, the crank is turned to rotate the unit clockwise as in FIGURE 33 and reciprocate the spool to cause the roller to roll off the arcuate end surface 450 of the bearing and retract into engagement with the rear arcuate surface 451 so that the axial abutment or surface 452 of the bearing 336 will cam and pivot the roller outwardly and back onto the periphery of the bearing 401, thereby causing the lever to pivot the control element into the path of the line, while allowing the unit to retract to its normal line winding position. In some instances, the roller may engage the rear arcuate surface 451 of the bearing 336 in lieu of its foremost end surface 450, in which event, less rotation of the unit is required to effect engagement of the roller with the axial surface 452 of such bearing. The organization has the advantage of permitting manual operation of the actuator to move the free end of the control element outwardly through the opening in the drum for stopping or controlling the flow of the line from the spool, irrespective of whether the roller is in engagement with the arcuate surfaces 450 or 451. The spacing between the rear end of the driven shaft and the connecting portion 458 of the yoke of the shiftable means 308 enables one to actuate the control element in the manner just described and so that the cam member will directly actuate and support the element. In other words, the control element can be operated independently of the unit when the unit is in either of its advanced forward positions determined by the roller engaging either of the arcuate surfaces 450 and 451 or when the unit is manually held in any one of a plurality of other advanced positions by application of pressure to the actuator. It will also be manifest that the operation of the control element under such circumstances is independent of the control lever.

Attention is directed to the fact that in some instances, the action of the line at the star of a cast will impart a counter-clockwise movement to the unit because the ratchet mechanism has not yet become effective to prevent such movement. In other words, the unit, as viewed in FIGURE 33 may rotate counter-clockwise a few degrees before the ratchet mechanism positively limits further rotation. If, during such rotation, the roller could engage the axial surface or abutment 452' of the bearing 336, the lever 431 would swing the free end of the control element outwardly to engage the line and instantly stop the cast. In order to prevent this act from occurring at the start of the cast, the lever is provided wih the finger 439, above referred to, which serves to engage the axial abutment 452' to positively prevent such counter-clockwise or reverse rotation of the unit when the ratchet mechanism has not become effective to prevent such rotation. When the crank is operated to rotate the unit in a clockwise direction the roller will, of course, roll against the opposite axial abutment 452 to cam the roller outwardly until it engages the periphery of the bearing 401 so that the unit will be automatically retracted to the line winding position by the spring 418 on the driven shaft.

In view of the foregoing, it will be manifest that the reel offers, among other things, a unique organization whereby the control element of the line control assembly serves the dual purpose of directing the line onto a spool as well as stop or retard release of the line from the spool. In other words, the control element is so constructed and arranged with respect to other associated components that a separate braking structure comprised, for example, of a pair of relatively movable axially disposed parts are not required. At no time is the line clamped, pinched or caused to be pulled between surfaces which will deform, roughen, cut or otherwise shorten its life or usefulness.

Attention is particularly directed to the important fact that reverse rotation of the line control assembly is continuously controlled by the adjustable drag assembly during all phases of reel operation, thereby providing a cushioned line control system which automatically provides a maximum safe load which can be placed on the line during the power swing of the cast, as well as stopping or snubbing the line during a cast. Otherwise expressed, when the drag is properly set for the tensile strength of the line being used, it is impossible to exceed the tensile strength of the line during any phase of the fishing operation.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. A spinning reel comprising a frame structure, a spool associated with the frame structure, tubular means, a bearing surface and an abutment stationarily associated with said tubular means, a shaft mounted in the tubular means for axial and rotary movement, a support carried by the fore end of the shaft, a line pickup member movably mounted on said support, a spring biased control for engaging said bearing surface and controlling said pickup member for directing a line onto the spool when the support is in one axial position and rotated, manually operable means, means responsive to said manually operable means for shifting the support, shaft, pickup member and control as a unit to a forward axial position relative to the spool to effect disengagement of said control from said surface and its engagement with said abutment to hold the unit in a forward position while releasing said pickup member, said responsive means being movable by said manually operable means when said unit is in said forward position for engaging and disengaging said pickup member for stopping or releasing the flow of a line from said spool, means for rotating the unit, and biasing means for causing retraction of said unit when said control is disengaged from said abutment for reengagement with said bearing surface.

2. A spinning reel comprising a frame, a tubular bearing mounted on said frame, a line support, a shaft mounted in the bearing for rotary and axial movements, a member mounted on the shaft in front of the line support, a cover carried by said frame substantially surrounding said support and member and having a front wall provided with an opening through which a line is adapted for passage and connection with said support, means affording a frictional connection between said member and said shaft, a bearing surface and an abutment stationarily associated with said frame, a pickup element movably carried by the member and provided with cooperating means, a locking part carried by said member cooperable with said element for engaging the bearing surface to locate the element in a line winding position, biasing means for normally urging the shaft, member, element and part as a unit rearwardly to a first position, means for rotating the unit in one direction while in the first position to cause the element to direct a line onto the support means for biasing said locking part in a direction toward said abutment, actuating means mounted for axial movement and provided with means interposed between said support and said member for engaging said cooperating means on said element, manually operable means, resilient means for normally urging the actuating means rearwardly to a normal position, said actuating means being responsive to said manual operable means to shift the unit forwardly to a predetermined position in which said locking part automatically engages said abutment to detain the unit in such position whereupon manual pressure may be removed from said manually operable means to permit the actuating means to automatically return to its normal position through the agency of said resilient means from which it may again be shifted forwardly by said manually operable means to engage said cooperating means on said pickup element to effect movement of the latter to retard the flow of line from the support or moved rearwardly to allow retraction of the element so the line may freely peel off the support, and means for preventing reverse rotation of said shaft while allowing reverse rotation of said member, element and part as an assembly relative to said shaft when the pull of the line against said element exceeds the resistance offered by said frictional connection.

3. A spinning reel comprising a frame, a line support associated with said frame, a shaft mounted with respect to the frame for axial and rotary movement, a member carried by the shaft, stationary abutment means, a line pickup movably mounted on the member for directing a line onto the support and controlling its flow therefrom, manually operable means, actuating means responsive to said manually operable means for axially moving the member, shaft and pickup as a unit forwardly from a normal position, means for automatically engaging the abutment means to temporarily detain the unit in a forward predetermined position when moved thereto by said manually operable means through the agency of said actuating means, means for automatically returning the actuating means to its normal position while the unit is so detained, and said actuating means being movable by said manually operable means and engageable with said pickup when said unit is detained for controlling the operation of said pickup to control the flow of a line adapted for attachment to said line support.

4. A subassembly for use with a spinning reel comprising an annular guide adapted to be mounted on a shaft in relation to a line support, a line control lever pivotally mounted on the guide for engaging and directing a line onto the support and controlling its release therefrom, and a control lever pivotally carried by the guide, one of said levers having a portion for engaging the other lever whereby they may be simultaneously moved together in one direction, said portion being disengageable from said other lever whereby said one lever may be moved independently of said other lever.

5. A spinning reel having a housing provided with a bearing, a support for a line adapted for connection therewith, a shaft mounted on the bearing, means for rotating the shaft in one direction and means for preventing its reverse rotation, a line guide rotatable on the shaft disposed opposite the support, an element pivotally mounted on the guide for movement to a position whereby the line may freely peel off the support and to another position for engaging the line so that a pull on the latter will rotate the member relative to the shaft when the shaft is held against rotation by said preventing means, means for retarding relative rotation between said guide and shaft, manually operable means, means responsive to said manually operable means whereby said shaft, guide and element may be shifted forwardly as a unit to a predetermined position, means for automatically holding said unit in said predetermined position, and said responsive means being engageable with said element when said unit is so held for controlling its positions by operating said manually operable means.

6. A spinning reel comprising a frame structure, a support for a line associated with the frame structure, a tubular bearing provided with a plurality of surfaces, a biased driven shaft mounted in the bearing for axial and rotary movement, an annular member carried by the fore end of the shaft, biased control means carried by the member for selectively engaging said surfaces, a line pickup lever carried by the member and operatively related to the control means, actuating means for shifting the member and shaft as a unit axially from an initial position to another position in which said control means automatically engages one of said surfaces to temporarily detain said unit in such position, means for returning the actuating means to its initial position while the unit is so detained, manually operable means for moving the actuating means toward said another position to engage and operate the pickup lever when the unit is detained for stopping or releasing the flow of a line adapted for connection with said suppport, and means for rotating the unit to release said control means from said one surface and thereby effect retraction of the unit to its initial position through the agency of said returning means and direct said control means onto another of the surfaces to move said lever to a position for winding the line onto the support when the unit is rotated.

7. A subassembly for use in a spinning reel comprising: a spool and a tubular bearing, a shaft mounted in the bearing for rotatable and slidable movement, a pickup assembly carried by the fore end of the shaft and comprising a drum, a control lever and a line pickup lever, said drum including a slotted cylindrical wall embracing a part of the spool and a base wall disposed in front of the spool, means pivotally connecting the levers to the base wall of the drum with the pickup lever disposed for movement in one direction through the slot for winding a line onto the spool and in a reverse direction to a position within the confines of the drum, said bearing being provided with a peripheral surface, an axial surface and a radial surface, said control lever being arranged to ride on the first peripheral surface when the cylindrical wall of the drum is embracing the spool part to maintain the pickup lever extended through the slot and against the radial surface to permit retraction of the pickup lever within the confines of the drum when the shaft is moved axially in the bearing to locate the pickup assembly in a predetermined forward position, said control lever serving to temporarily maintain said pickup assembly in said forward position, means for engaging and actuating said pickup lever for controlling the flow of the line from said spool when said pickup assembly is in said forward position, and means for retracting the pickup assembly and shaft as a unit when the unit is rotated so that the axial surface will cause the control lever to ride onto the peripheral surface and effect projection of the pickup lever through the slot for winding the line onto the spool.

8. A subassembly for use on a fishing pole comprising: a non-rotatable spool and a coaxially disposed tubular bearing carried thereby and projecting therebeyond, said bearing being formed with a first peripheral cylindrical portion and a second reduced contiguous cylindrical portion, the outer end of said first cylindrical portion being formed with a pair of diametrically disposed cut away areas defining radial chordal shaped abutment surfaces with the base of each chord tangential to the surface of said reduced portion, a shaft extending through said bearing for rotatable and sliding movement, a line pickup assembly rotatably mounted on the fore end of said shaft, adjustable friction means imposing a drag upon relative rotary movement of said shaft and assembly, said pickup assembly comprising a circular cup member having a bottom wall with an opening therein receiving said shaft and with its side wall formed with a circumferential slot and being movable upon retraction of said shaft for embracing a portion of said spool, a pivot carried by said bottom wall of said chamber, an L-shaped line pickup lever element having the end of one of its legs mounted on said pivot means with the other leg thereof extending generally radially of said shaft to be projected and retracted through said slot, and a control element for said pickup element also pivotally mounted on said pivot in axial alignment with said pickup element, said control element having a portion engageable under the first leg of said pickup element for positively moving the latter toward its projected position, said control element having an additional portion selectively engageable with the cylindrical portions and abutment surfaces of said bearing during rotation and sliding movement of said shaft for controlling the radial position of said pickup element, resilient means biasing said elements toward retracted position of said pickup element, and manually operable means whereby said pickup assembly may be shifted so that control element may engage either of said abutment surfaces for detaining said assembly in a predetermined position, said manually operable means also being operable to engage said pickup element when said assembly is detained for controlling a line adapted for attachment to said spool.

9. A fishing reel comprising a frame, a line receiving spool structure associated with said frame, a tubular bearing fixed to and extending coaxially beyond said spool structure, the exterior of said bearing being formed with a first cylindrical surface and a second like surface of reduced diameter and a radial abutment surface at the outer end of said first-named surface, a shaft extending through said bearing for rotational and endwise movement, an annular member rotatably mounted on the fore end of said shaft and coaxially therewith, adjustable friction means imposing a drag against rotation of said annular member on said shaft, an elongate line pickup element mounted on said annular member to be protruded beyond and withdrawn within the periphery thereof, a shiftable control element for said pickup element also mounted on said member, said control element having a first portion engageable with said surfaces and abutment of said bearing as determined by the axial position of said shaft and a second portion engaging said pickup element for positively moving the latter toward projected position, said pickup element including a cam portion extending outwardly from said shaft, a ring element between said spool structure and said annular member and coaxially with said shaft, reciprocable means sustaining said ring for movement into engagement with said cam portion for protruding said pickup element independently of said control element, an actuator device for moving said reciprocable means and ring toward said annular member, and resilient means biasing said reciprocable means in the opposite direction.

10. A fishing reel comprising a frame, a line receiving spool fixedly mounted on said frame, a tubular bearing fixed relative to said spool and extending coaxially beyond said spool, the exterior of said bearing being formed with spaced arcuate surfaces of different radii and a radial abutment surface therebetween, a shaft extending through said bearing for rotational and endwise movement, an annular guide member mounted on the fore end of said shaft and coaxially therewith, a line pickup element mounted on said guide member to be projected beyond and withdrawn within the peripheral confines thereof, said pickup element having a cam surface, a shiftable control element for said pickup element also mounted on said guide member, said control element having a first portion selectively engageable with said surfaces and abutment of said bearing as determined by the axial position of said shaft, and a second portion extending under and engageable with said pickup element for positively moving the latter toward projected position, resilient means biasing both said elements toward retracted position of the pickup element, spring returnable actuating means for shifting said shaft and guide members as a unit axially from an initial inner position to another position in which the control element engages said abutment surface to releasably detain said unit in such latter position, a circular element fixed to said actuating means to move therewith and positioned between said spool structure and said guide member for acting on said cam surface, and manually operable means for moving the actuating means toward said other position to engage said cam and project the pickup element.

11. A fishing reel assembly comprising a frame, a non-rotatable spool structure on said frame for receiving a line, a bearing fixed relative said spool structure and extending coaxially therebeyond, the exterior of the bearing being formed with axially spaced cylindrical portions of different diameters and at least one of the cylindrical portions being provided with a radial abutment portion, a shaft extending through said bearing for rotary and axial movement, uni-directional drive means for rotating said shaft, a circular line guide rotatably mounted on the fore end of said shaft including adjustable friction means for imposing a selected drag controlling relative rotary movement between said shaft and guide, an elongate pickup element movably mounted on said guide for projection of an end thereof beyond the periphery of said guide and retraction therof, a control element also movably mounted on said guide and engaging said pickup element to move the latter to projected position, said control element having means engageable with said cylindrical portions of said bearing upon axial movement of said shaft for determining the position of the pickup element and said means being engageable with said abutment portion for detaining said guide in a forward position, resilient means biasing said pickup and control elements inwardly toward said shaft, and means engageable with said pickup element when said guide is detained for effecting projection or retraction of said end of said pickup element for controlling the release of a line adapted for attachment to said spool structure.

12. A reel assembly of the character described comprising a frame, a non-rotatable spool associated with said frame, a shaft mounted on said frame coaxially of said spool for axial and rotary movement, a circular member carried by the fore end of the shaft, adjustable friction means offering resistance to rotation of said member on said shaft, stationary abutment means disposed adjacent the axis of said shaft, a line pickup element movably mounted on said member for projection beyond the periphery of said member for directing a line onto said spool when engaged therewith and controlling its flow therefrom, actuating means for axially moving said shaft, member and pickup element as a unit forwardly from a normal position, a control element movably mounted on said member, resilient means biasing said control element toward said shaft for automatically engaging said abutment means to temporarily detain the unit in a forward position determined by said abutment when moved thereto by said actuating means, bias means tending to return the actuating means to normal position, said pickup element having a cam surface extending outwardly from said shaft and said actuating means including a cam element operable upon further forward movement of said actuating means beyond said detained position to engage said cam surface of said pickup element for projecting the latter into position to engage said line to control the flow thereof from said spool.

13. A fishing reel structure comprising a frame, a non-rotatable spool fixed on said frame, a tubular bearing mounted on said frame coaxially with said spool, a shaft extending through said bearing for rotary and axial movements, a circular member rotatably mounted on the fore end of said shaft and including adjustable friction drag means acting between said shaft and member, the exterior of said bearing being formed with cylindrical surfaces of different diameters and at least one return abutment portion, a retractible pickup element movably mounted on said member to have an end thereof move to protrude beyond the periphery of said member, a locking part pivotally mounted on said member and having an engagement with said pickup element for protruding the same, resilient means for urging said element and part to retracted positions, said part being engageable with said cylindrical surfaces to control protrusion and retraction of said pickup element, resilient means normally urging the shaft, member, element and part as a unit rearwardly to a first position, means for rotating the unit in one direction while in the first position to cause the element to direct line onto the spool, actuating means mounted for movement axially of said shaft, resilient means biasing said actuating means toward said first position, said actuating means being responsive to manual thrust to shift the unit forwardly to a forward position determined by engagement of said locking part with said abutment portion to detain the unit in such position with the pickup element retracted, whereupon the actuating means will return to said first position upon removal of said thrust, said pickup element having a cam surface and said actuating means including a cam element engageable therewith upon further forward movement thereof beyond said forward position to project said element, and on rearward movement to permit retraction of the element.

14. A fishing reel comprising a frame, a line receiving spool associated with said frame, a tubular bearing extending coaxially beyond said spool, the exterior of said bearing being formed with a cylindrical bearing surface and a radial abutment in advance of said bearing surface, a shaft extending through said bearing for rotational and endwise movement, an annular member mounted on the fore end of said shaft and coaxially therewith, adjustable friction means offering resistance to rotation of said member on said shaft, a line pickup element mounted on said annular member to be projected beyond and retracted within the periphery thereof, a control for said pickup element also mounted on said member, said control having a first portion for engaging said surface and a second portion extending behind said pickup element for positively holding the latter in a projected position, resilient means biasing said element and control toward retracted position of the pickup element, manually operable means, means responsive to said manually operable means whereby said member, element and control as a unit may be shifted from one position to a predetermined forward position to enable said control to move into engagement with said abutment for temporarily detaining said unit in said forward position, said responsive means being engageable with said element for controlling the release of a line from said spool or its retraction by said resilient means when said unit is detained, means for urging said unit to said one position, means for driving said shaft and unit thereon, and means on said bearing engageable with said control for automatically returning said control onto said bearing surface through the agency of said urging means when said driving means is operated.

15. The apparatus as defined in claim 14 wherein a circular cover envelopes the spool and annular member in spaced relation thereto, the outer wall of said cover having an opening aligned with said shaft for access to said friction means and passage of the line to said spool, and said tubular bearing is carried by said spool.

16. A spinning reel comprising a frame provided with a line support, a driven shaft mounted with respect to said frame for axial and rotary movement, a member carried by said shaft, stationary abutment means, a line pickup movably mounted on said member for directing a line onto said support and controlling its flow therefrom, a drive shaft operatively connected to said driven shaft, a crank for rotating said member and said driven shaft through said drive shaft, manually operable means, actuating means responsive to said manually operable means for axially moving said member, shaft and pickup as a unit forwardly from a normal position, means for automatically engaging said abutment means to temporarily detain said unit in a forward predetermined position when moved thereto by said manually operable means through the agency of said actuating means, means for automatically returning said actuating means to its normal position when the unit is so detained, said actuating means being movable by said manually operable means and engageable with said pickup when said unit is detained for controlling the operation of said pickup to control the flow of a line adapted for attachment to said line support, and friction means interposed between said member and said crank affording at least retarded reverse rotation of said member when said crank is in a stationary condition and there is an outward pull of sufficient force on a line against said pickup.

17. In a spinning reel having annular means defining a line support and a shaft coaxial therewith; a subassembly comprising an annular guide mounted on said shaft, a line control element pivotally mounted on the guide for engaging and directing a line onto the support and controlling its release therefrom, and a control lever carried by the guide and structurally related to the element for engaging the same and controlling its pivotal movement on said guide, and means for operating said line control element relative to said control lever.

18. The structure defined in claim 17, including means for biasing said line control element and said control lever for movement in the same general direction.

19. The structure defined in claim 17, in which said line control element is pivotally mounted on a stud carried by said guide and said control lever is also pivotally mounted on said stud.

20. The structure defined in claim 17, in which said line control element is pivotally mounted on a stud carried by said guide, said control lever is also pivotally mounted on said stud, and said stud carries biasing means for biasing said line control element and said control lever axially on said stud.

21. A spinning reel comprising: a spool adapted for reciprocation and a tubular bearing, a shaft mounted in the bearing for rotatable and slidable movement, a line control assembly carried by the fore end of the shaft and comprising a drum, a control element and a biased lever, said drum having a cylindrical wall provided with an opening and a base wall disposed in front of the spool, means pivotally connecting the element and lever for movement relative to the base wall of the drum and relative to each other with the element disposed for movement through the opening for winding a line onto the spool and in a reverse direction to a position within the confines of the drum, said bearing being provided with a peripheral surface, an axial surface and a radial surface, said lever being arranged to ride on the peripheral surface to shift and maintain the element extended through the opening for line winding purposes, means for shifting the shaft and control assembly as a unit forwardly to a predetermined position to cause said lever to engage said radial surface and temporarily detain the unit in such position and permit retraction of said element, means for reciprocating the spool and rotating the unit, and means for retracting the unit as the unit is rotated so that the axial surface will cause the lever to ride onto the peripheral surface and reproject the element through the opening for winding the line onto the spool.

22. A spinning reel comprising a frame, a support for a line mounted on the frame for reciprocation, a tubular bearing provided with a plurality of surfaces, a biased driven shaft mounted in the bearing for axial and rotary movement, an annular member carried by the fore end of the shaft, biased control means carried by the member for selectively engaging said surfaces, a line control element carried by the member and operatively related to the control means, said control means and said element being movable with respect to one another and said member, actuating means for shifting the member and shaft as a unit axially from an initial position to another position in which said control means automatically engages one of said surfaces to temporarily detain said unit in such position, means for returning the actuating means to its initial position while the unit is so detained, manually operable means for moving the actuating means toward said another position to operate the line control element for stopping or releasing the flow of a line adapted for connection with said support, and means for reciprocating the support and rotating the unit to release said control means from said one surface and thereby effect retraction of the unit to its initial position through the agency of said returning means and direct said control means onto another of the surfaces to move said element to a position for winding the line onto the support when the unit is rotated.

23. A spinning reel comprising a frame provided with a spool adapted for reciprocation, a shaft mounted with respect to the frame for axial and rotary movement, a member carried by the shaft, a line control element movably mounted on the member for directing a line onto the spool and for controlling its flow therefrom, actuating means for axially moving the member, shaft and pickup as a unit forwardly from a normal position, movable means for automatically temporarily detaining the unit in a forward predetermined position when moved thereto by said actuating means, said element and said movable means being movable with respect to one another and said member, means for biasing the unit in a rearward direction, means for automatically returning the actutaing means to its normal position while the unit is so detained, said actuating means being movable while the unit is so detained for controlling the operation of said element to control the flow of line from said spool, means for reciprocating the spool and rotating the unit to release the unit for retraction to said normal position through the agency of said biasing means, and means for moving the element to a line winding position when the unit is in the normal position and rotated.

24. A spinning reel comprising: a bearing, a shaft mounted on said bearing for rotation and reciprocation, a spool surrounding the shaft and mounted for reciprocation, abutment means and a bearing surface associated with said bearing and located in front of the spool, a support carried by the shaft and disposed relative to the spool, a line control element movably mounted on the support, a biased control member movably mounted on the support for selectively engaging the abutment and bearing surface for influencing the control element, said element and said member being movable with respect to one another and said support, means for reciprocating the spool and rotating the shaft and support as a unit with the control member engaging the bearing surface to forcibly position the control element for winding a line onto the spool when the line is connected to the spool, means for shifting the unit forwardly to a predetermined position whereby the control member will disengage the bearing surface and automatically engage said abutment means to temporarily detain the unit in said position and release the control element, means for biasing the unit rearwardly, said shifting means being manually operable to manipulate the control element independently of the control member for engaging or disengaging the line to release or prevent the line from unwinding from the spool while the unit is so detained, means for automatically retracting the shifting means, and means for causing the control member to disengage the abutment means and allow retraction of the unit to a position with the control member engaging said bearing surface to reposition the control element for winding the line onto the spool when the unit is rotated.

25. A spinning reel comprising: a bearing, a shaft mounted on said bearing for rotation and reciprocation, a reciprocably mounted spool surrounding the shaft, abutment means and a bearing surface associated with said bearing and located in front of the spool, a support carried by the shaft and disposed relative to the spool, means offering frictional resistance to relative rotation between the support and shaft, a line control element movably mounted on the support, a biased control member movably mounted on the support for selectively engaging the abutment and bearing surface for influencing the control element, said element and said member being movable with respect to one another and said support, means for reciprocating the spool and rotating the shaft and support as a unit with the control member engaging the bearing surface to forcibly position the control element for winding a line onto the spool when the line is connected to the spool, means for shifting the unit forwardly to a predetermined position whereby the control member will disengage the bearing surface and automatically engage said abutment means to temporarily detain the unit in said position and release the control element, means for biasing the unit rearwardly, said shifting means being manually operable to manipulate the control element independently of the control member for engaging or disengaging the line to release or prevent the line from unwinding from the spool while the unit is so detained, means for automatically retracting the shifting means, and means for causing the control member to disengage the abutment means and allow retraction of the unit to a position with the control member engaging said bearing surface to reposition the control element for winding the line onto the spool when the unit is rotated, said means offering frictional resistance being operable to permit controlled relative rotational movement between the shaft and support when the outward pull on the control element exceeds such resistance.

26. A spinning reel comprising: a bearing a shaft mounted on the bearing for rotation and reciprocation, a spool adapted for reciprocation, a support connected to a fore end of the shaft, line control means and biased means carried by the support, means for reciprocating the spool and rotating the shaft and support as a unit to cause the control means to wind a line onto the spool when connected thereto, an abutment located in front of the spool, manually operable means for shifting the unit forwardly to a predetermined position whereby said biased means automatically engages said abutment to temporarily detain the unit in such position, and means responsive to said shifting means for actuating said control means to release or stop the flow of line from the spool while the unit is so detained.

27. A spinning reel comprising: a frame, a cover carried by said frame and provided with an opening for guiding a line, a bearing carried by said frame, a shaft mounted on the bearing for rotation and reciprocation, a reciprocably mounted spool, a support connected to a fore end of the shaft, line control means and biased means carried by the support, means for reciprocating the spool and rotating the shaft and support as a unit to cause the control means to wind a line onto the spool when connected thereto, an abutment located in front of the spool, manually operable means for shifting the unit forwardly to a predetermined position whereby said biased means automatically engages said abutment to temporarily detain the unit in such position, and means responsive to said shifting means for actuating said control means to release or stop the flow of line from the spool while the unit is so detained.

28. A spinning reel comprising: a bearing, a shaft mounted on the bearing for rotation and reciprocation, a spool adapted for reciprocation, a support connected to a fore end of the shaft, line control means and biased means, means for connecting said control means and said biased means on said support for movement with respect to one another, means for reciprocating the spool and rotating the shaft and support as a unit to cause the control means to wind a line onto the spool when connected thereto, an abutment located in front of the spool, means for shifting the unit forwardly to a predetermined position whereby said biased means automatically engages said abutment to temporarily detain the unit in such position, means responsive to said shifting means whereby said control means may be actuated to release or stop the flow of line from the spool while the unit is so detained, and adjustable means operatively associated with said shaft and support offering some frictional resistance to relative rotation therebetween and being operative to permit such relative rotation when an outward pull of the line on the line control means exceeds a predetermined adjusted resistance.

29. A spinning reel comprising: a bearing, a shaft mounted on the bearing for rotation and reciprocation, a spool adapted for reciprocation, a support connected to a fore end of the shaft, line control means and biased means, means for connecting said line control means and said biased means on said support for movement with respect to one another, means for reciprocating the spool and rotating the shaft and control means as a unit to cause the control means to wind a line onto the spool when connected thereto, an abutment located in front of the spool, means for shifting the unit forwardly to a predetermined position whereby said biased means automatically engages said abutment to temporarily detain the unit in such position, means responsive to said shifting means whereby said control means may be actuated independently of said biased means to release or stop the flow of line from the spool while the unit is so detained, and means for returning the unit to a line winding position.

30. A reel of the kind described comprising a support for receiving a line adapted for reciprocation, abutment means, a driven shaft extending through the support for rotational and reciprocating movement, a driven gear keyed to the shaft, a line control assembly carried by and rotatable on the shaft, a line control element movably mounted on the assembly, driving means for reciprocating the support and rotating the shaft and assembly as a unit in one direction relative to the support to cause a line attached to the support to be wound thereupon by said assembly, said driving means including a drive gear engaging the driven gear, a drive shaft rotatable in only one direction, means operatively associated with the driven shaft and assembly affording controlled reverse rotation of the assembly in response to an outward pull on the line so that the line will unwind from the support without twisting, means for shifting the unit to a temporary predetermined position, movable means carried by said control assembly and being movable with respect to said element for engaging said abutment means, and means responsive to said shifting means for controlling the operation of said control element to release or stop the flow of line from the spool when the unit is held in said predetermined position by said movable means.

31. A subassembly for use with a spinning reel comprising an annular guide having an end wall adaped to be mounted on a shaft in relation to a line support, an element pivotally mounted on the guide for engaging and directing a line onto the support and controlling its release therefrom, a control pivotally carried by the guide for movement independent of said element and having a portion for cooperation therewith for influencing its movement, and a roller carried by said control and disposed between said end wall and said element.

32. An assembly for use with a spinning reel for controlling a line, said assembly comprising a support having an end wall adapted for connection with a driven shaft for rotation therewith, an element pivotably mounted on the support for engaging the line to control its movement relative to a spool, a member pivotally mounted on the support for engaging and disengaging said element assisting in the control of said element, and means movably carried by said member and disposed between said end wall and said element assisting in the control of said member.

33. An assembly for use with a spinning reel for controlling a line, said assembly including a support for connection with a driven shaft, a stud secured to the support, an element pivotally mounted on the stud for engaging and controlling a line with respect to a spool, a member pivotally mounted on the stud assisting in the control of said element, and a roller carried by said member assisting in the control thereof.

References Cited by the Examiner

UNITED STATES PATENTS

| | | | |
|---|---|---|---|
| 2,614,768 | 10/1952 | Shakespeare | 242—84.1 |
| 2,705,601 | 4/1955 | Clickner | 242—84.1 |
| 2,711,292 | 6/1955 | Taggart et al. | 242—84.21 |
| 2,773,654 | 12/1956 | Hubner | 242—84.21 |
| 2,859,924 | 11/1958 | Sarah | 242—84.54 |
| 2,896,876 | 7/1959 | Bogar | 242—84.54 |
| 2,901,193 | 8/1959 | Askins et al. | 242—84.21 |
| 3,025,020 | 3/1962 | Sarah | 242—84.21 X |
| 3,062,474 | 11/1962 | Clark | 242—84.2 |
| 3,105,651 | 10/1963 | Hull | 242—84.2 |
| 3,114,514 | 12/1963 | Clark | 242—84.21 |

FOREIGN PATENTS 820,874 9/1959 Great Britain.

FRANK J. COHEN, Primary Examiner.

MERVIN STEIN, Examiner.

B. S. TAYLOR, Assistant Examiner.